(12) United States Patent
Takayama et al.

(10) Patent No.: US 9,493,238 B2
(45) Date of Patent: Nov. 15, 2016

(54) BYSTANDER INTERACTION DURING DELIVERY FROM AERIAL VEHICLE

(71) Applicant: Google Inc., Mountain View, CA (US)

(72) Inventors: Leila Takayama, Mountain View, CA (US); Matthew Ball, Mountain View, CA (US); Joanna Cohen, Mountain View, CA (US); Roger William Graves, San Francisco, CA (US); Mathias Samuel Fleck, Milpitas, CA (US); Andrew Lambert, Mountain View, CA (US); James Ryan Burgess, Redwood City, CA (US); Paul Richard Komarek, San Jose, CA (US); Trevor Shannon, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/077,571

(22) Filed: Mar. 22, 2016

(65) Prior Publication Data

US 2016/0236778 A1    Aug. 18, 2016

Related U.S. Application Data

(63) Continuation of application No. 14/325,994, filed on Jul. 8, 2014, now Pat. No. 9,321,531.

(51) Int. Cl.
*B64D 1/02* (2006.01)
*B64D 47/06* (2006.01)
*B64C 39/02* (2006.01)

(52) U.S. Cl.
CPC .................. *B64D 1/02* (2013.01); *B64C 39/02* (2013.01); *B64D 47/06* (2013.01); *B64C 2201/128* (2013.01); *B64C 2201/141* (2013.01); *B64C 2201/146* (2013.01)

(58) Field of Classification Search
CPC ............. B64D 1/02; B64D 1/12; B64D 1/08
USPC ....................................... 244/137.4
See application file for complete search history.

(56) References Cited

U.S. PATENT DOCUMENTS 2,468,009 A * 4/1949 Bigley, Jr. ............ B64D 17/383
                                                244/118.1
4,993,665 A * 2/1991 Sparling .................. B64D 9/00
                                                244/118.1

(Continued)

*Primary Examiner* — Justin Benedik
(74) *Attorney, Agent, or Firm* — McDonnell Boehnen Hulbert & Berghoff LLP

(57) ABSTRACT

An unmanned aerial vehicle (UAV) is disclosed that includes a retractable payload delivery system. The payload delivery system can lower a payload to the ground using an assembly that secures the payload during descent and releases the payload upon reaching the ground. The assembly can also include a bystander communication module for generating cues for bystander perception. While the assembly securing the payload is being lowered from the UAV, the bystander communication module can generate an avoidance cue indicating that bystanders should avoid interference with the assembly. The assembly also includes sensors that generate data used, at least in part, to determine when the descending assembly is at or near the ground, at which point the assembly releases the payload. The bystander communication module can then cease the avoidance cue and the UAV can retract the assembly.

18 Claims, 14 Drawing Sheets

(56) References Cited

U.S. PATENT DOCUMENTS

| | | | |
|---|---|---|---|
| 5,417,304 A * | 5/1995 | Kurtgis | B64D 1/22 182/150 |
| 9,174,733 B1 * | 11/2015 | Burgess | B64D 1/12 |
| 2014/0263840 A1 * | 9/2014 | Potter | B65D 88/027 244/142 |

* cited by examiner

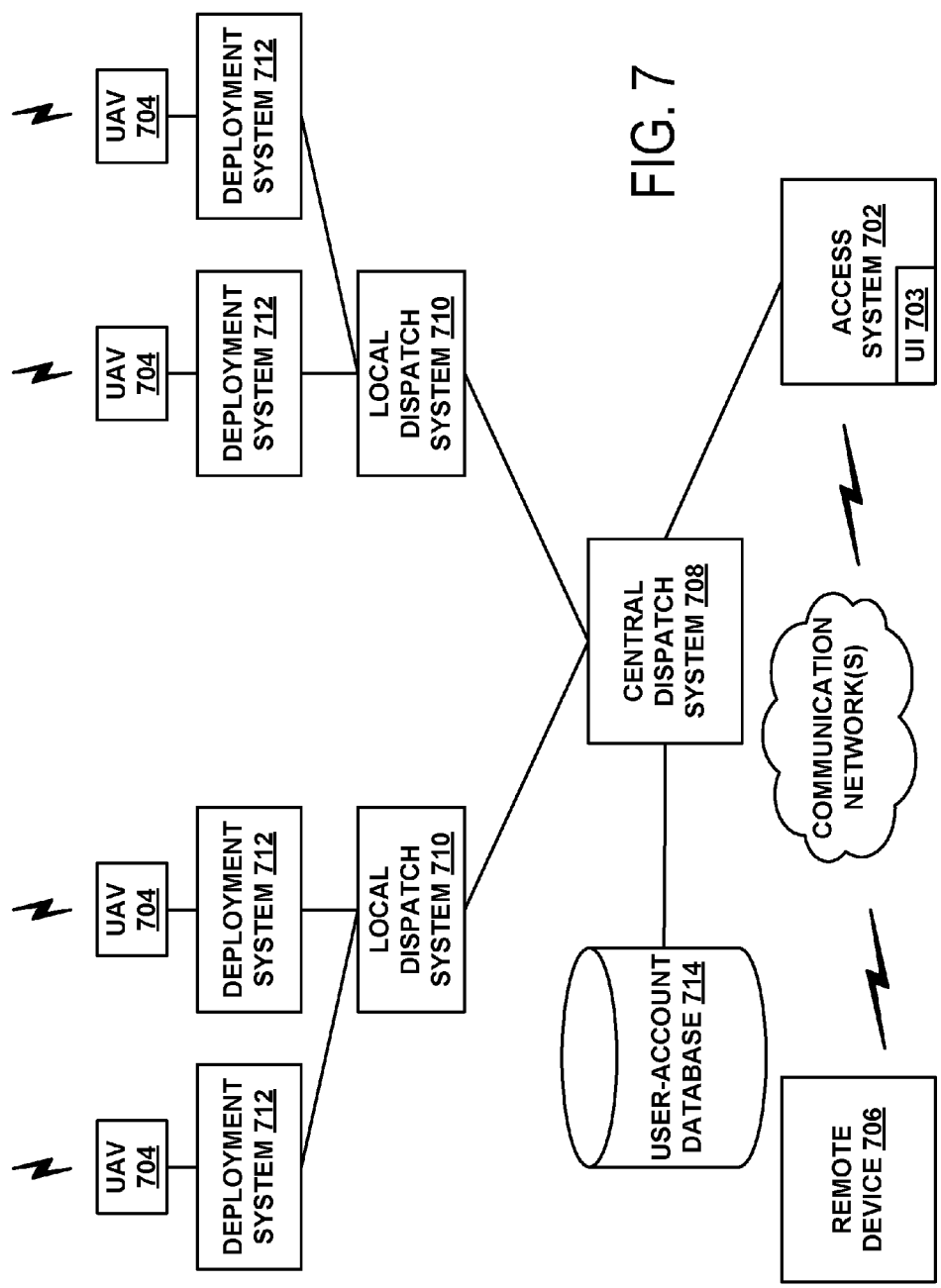

BYSTANDER INTERACTION DURING DELIVERY FROM AERIAL VEHICLE

CROSS REFERENCE TO RELATED APPLICATION

This application claims priority to U.S. patent application Ser. No. 14/325,994, filed Jul. 8, 2014, now pending, the contents of which are incorporated by reference herein for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land.

SUMMARY

An unmanned aerial vehicle (UAV) is disclosed that includes a retractable payload delivery system. The payload delivery system can lower a payload to the ground using an assembly that secures the payload during descent and releases the payload upon reaching the ground. The assembly can also include a bystander communication module for generating cues for bystander perception. While the assembly securing the payload is being lowered from the UAV, the bystander communication module can generate an avoidance cue indicating that bystanders should avoid interference with the assembly. The assembly also includes sensors that generate data used, at least in part, to determine when the descending assembly is at or near the ground, at which point the assembly releases the payload. The bystander communication module can then cease the avoidance cue and the UAV can retract the assembly.

In one aspect, an example system may include a retractable delivery system, a bystander communication module, and a control system. The retractable delivery system can include a tether and a retraction system. The tether can be coupled to a UAV and an assembly. The retraction system can be coupled to the tether and operable to lower, from the UAV, the assembly and a payload secured by the assembly. The assembly can include one or more electromechanical components configured to selectively secure the payload and release the payload. The bystander communication module can be situated on the assembly. The bystander communication module can be configured to generate an avoidance cue for bystander perception. The control system can be configured to, while the UAV hovers over a delivery location, use the retractable delivery system to initiate delivery. Initiating delivery can include lowering the assembly toward the ground such that the payload descends from the UAV. The control system can also be configured to, while the payload is descending from the UAV, cause the bystander communication module to generate the avoidance cue. The control system can also be configured to determine that the payload is at or near the ground. The control system can also be configured to cause the assembly to release the payload in response to determining that the payload is at or near the ground.

In another aspect, an example method may include initiating delivery using a retractable delivery system while a UAV hovers over a delivery location. The retractable delivery system can include a tether and a retraction system. The tether can be coupled to the UAV and an assembly. The retraction system can be coupled to the tether and operable to lower, from the UAV, the assembly and a payload secured by the assembly. The assembly can include one or more electromechanical components configured to selectively secure the payload and release the payload. Initiating delivery can include lowering the assembly toward the ground such that the payload descends from the UAV. The example method may also include causing a bystander communication module to generate an avoidance cue for bystander perception while the payload is descending from the UAV. The bystander communication module can be situated on the assembly. The example method may also include determining that the payload is at or near the ground. The example method may also include causing the assembly to release the payload in response to determining that the payload is at or near the ground.

In another aspect, an example system may include a retractable delivery system, a bystander communication module, and a control system. The retractable delivery system can include a tether and a retraction system. The tether can be coupled to a UAV and releasably coupled to a payload. The retraction system can be coupled to the tether and operable to lower the payload from the UAV. The bystander communication module can be situated on the payload. The bystander communication module can be configured to generate an avoidance cue for bystander perception. The control system can be configured to use the retractable delivery system to initiate delivery while the UAV hovers over a delivery location. Initiating delivery can include lowering the payload toward the ground such that the payload descends from the UAV. The control system can also be configured to cause the bystander communication module to generate the avoidance cue while the payload is descending from the UAV. The control system can also be configured to determine that the payload is at or near the ground. The control system can also be configured to cause the retractable delivery system to release the payload in response to determining that the payload is at or near the ground.

In another aspect, a non-transitory computer readable medium has stored therein instructions executable by a computing device to cause the computing device to perform operations. The operations can include initiating delivery using a retractable delivery system while a UAV hovers over a delivery location. The retractable delivery system can include a tether and a retraction system. The tether can be coupled to the UAV and an assembly. The retraction system can be coupled to the tether and operable to lower, from the UAV, the assembly and a payload secured by the assembly. Initiating delivery can include lowering the assembly toward the ground such that the payload descends from the UAV. The operations can also include causing a bystander communication module to generate an avoidance cue for bystander perception while the payload is descending from the UAV. The bystander communication module can be situated on the assembly. The operations can also include determining that the payload is at or near the ground. The operations can also include causing the assembly to release the payload in response to determining that the payload is at or near the ground.

In yet another aspect, an example system may include means for include initiating delivery using a retractable delivery system while a UAV hovers over a delivery location. The example system may also include means for causing a bystander communication module to generate an avoidance cue for bystander perception while a payload is descending from the UAV. The example system may also include means for determining that the payload is at or near the ground. The example system may also include means for causing the retractable delivery system to release the payload in response to determining that the payload is at or near the ground.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 7 is a simplified block diagram illustrating a distributed UAV system, according to an example embodiment.

DETAILED DESCRIPTION

Figure 1B:
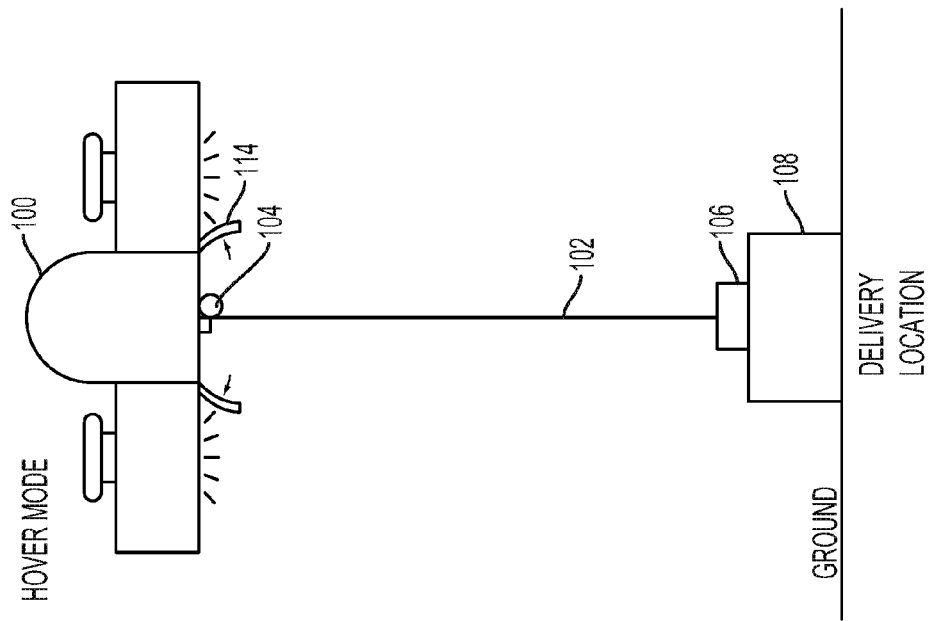
FIGS. 1A and 1B show a UAV that includes a payload delivery system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example embodiments may relate to and/or be implemented in a system in which unmanned vehicles, and in particular, "unmanned aerial vehicles" (UAVs), are configured to deliver payloads at delivery locations. UAVs in such a system may operate in an autonomous or semi-autonomous delivery system in which the UAV carries a payload from a first location, such as a distribution center, to a delivery location, such as a residence or business. At the distribution center, the UAV can be loaded with the payload to be delivered, and then the UAV can navigate to the delivery location. The UAV can then transition to a hover mode while situated above the delivery location.

While hovering, the UAV can autonomously deliver the payload using a retractable delivery system that lowers the payload to the ground while the UAV hovers above. The delivery system can include an assembly coupled to the UAV by a tether. A winch can unreel and reel in the tether to lower and raise the assembly. The assembly can be configured to secure the parcel while being lowered from the UAV by the tether and release the parcel upon reaching ground level. The assembly can then be retracted to the UAV by reeling in the tether using the winch. The assembly can also include sensors such as a barometric pressure based altimeter and/or accelerometers to assist in detecting the position of the assembly relative to the ground. Data from the sensors can be communicated back to the UAV and/or a control system over a wireless link and used to help in determining when the assembly has reached ground level (e.g., by detecting a measurement with the accelerometer that is characteristic of ground impact).

The assembly can secure the payload using various techniques. The assembly may include claws and/or gripping members that selectively open and close to grasp the payload and secure the parcel by static friction. The assembly may also include hooks or bars configured to engage handles or apertures in the payload. Or the payload may be equipped with one or more retaining pins or bumps that engage corresponding grooves in gripping members that can be actuated to move closer together (and thereby secure the payload by engaging the pins) or move apart (and thereby release the payload). In some cases, the assembly may be a vessel with a trap door on bottom that is closed to secure the payload within, and selectively opened to release the payload. The assembly can use a variety of other techniques to selectively secure and release payloads.

However, during a delivery operation using the retractable system, it is desirable to keep the assembly and tether free from interference with obstacles, and particularly with any bystanders. Without some intuitive cue, any people nearby, particularly those unfamiliar with UAV-based delivery systems, may be tempted to reach out and grab either the assembly, the tether, or the payload itself while the assembly is being lowered to the ground. Such an incident may jeopardize a successful delivery of the payload and/or retrieval of the assembly, and also may create a potential safety hazard.

To help mitigate such risks, the assembly can be equipped with a user interface module that is used to convey information to a person on the ground as the payload is lowered from the UAV and thereby facilitate safe, efficient bystander interaction with the UAV delivery system. The user interface is referred to herein as a bystander communication module. The bystander communication module can generate visible and/or audible perceptible cues that communicate information to nearby persons in an intuitive manner. For example, the bystander communication module can generate an avoidance cue while the assembly (and payload) are being lowered to the ground. The avoidance cue may be an audio or visual message that discourages people from approaching (or contacting) the assembly, the tether, and the payload. Once the payload has been released and the assembly begins being retracted toward the UAV, the bystander communication module may generate another perceptible cue that encourages a nearby person to retrieve the payload from the ground.

Thus, in some cases, the assembly may include a light source that can emit light in one or more colors. A person on the ground may perceive that the assembly blinks red or yellow (e.g., a warning light) as the assembly is lowered to the ground, and therefore stay back from the lowering assembly. Upon reaching the ground, and releasing the payload, the light source may begin emitting a solid green light as it rises back to the UAV. The person on the ground may interpret the green light as an indication that is safe to approach the payload. In another example, the assembly may include a loudspeaker that outputs a beeping sound (e.g., similar to a truck backing up), or a recorded spoken message (e.g., "delivery in progress, do not approach"), or some other audible cue that discourages people from approaching the assembly and/or tether while it is being lowered. Upon reaching the ground, and releasing the payload, the loudspeaker may begin outputting a confirmation sound (e.g., a chime sound), or another recorded spoken message (e.g., "delivery complete, please retrieve your package"), or some other audible cue that indicates the delivery is complete and that it is safe to approach the payload.

The retractable delivery system can also function to automatically adjust the speed of descent and/or ascent to facilitate efficient and safe delivery of a payload from the hovering UAV. During delivery, the winch can function to control the speed of descent and ascent of the assembly. The assembly may initially be dropped as fast as possible until the assembly reaches a height at which contact/interaction with people/objects on the ground becomes relatively more likely (e.g., about 12-15 feet), and then slow to a descent rate that make injuries unlikely, but is fast enough to discourage people from grabbing the payload before it reaches the ground. Once the assembly reaches the ground and releases the payload, it is retracted to the UAV by the winch. During retraction, the assembly initially travels at a speed that is slow enough to reduce likelihood of injuries, while fast enough to discourage a user from grabbing the assembly. Once at a safe height (e.g., an unreachable height such as about 12-15 feet), the winch speeds up to its maximum speed. Allowing the assembly to ascend/descend at close to maximum speeds when not within reach of people or typical objects on the ground allows the entire delivery operation to occur faster, which saves time and fuel and increases efficiency. Slowing the assembly's ascent/descent while it is closer to the ground increases safety and provides intuitive bystander interaction with the UAV delivery system.

To make adjustments to the ascent/descent rates and/or output from the bystander communication module, the system can include a control system that makes several determinations during delivery based on input from one or more sensors. The control system can determine: (i) while descending, that the assembly is within a reachable distance from the ground, (ii) that the assembly and/or parcel have reached the ground; and (iii) while ascending, that the assembly is beyond the reachable distance from the ground. In response to determining that the assembly is within the reachable distance, the control system can cause the rate of descent of the assembly to slow and/or cause the bystander communication module to generate an avoidance cue that discourages bystanders from approaching the assembly and/or tether. In response to determining that the assembly and/or parcel have reached the ground, the control system can cause the assembly to release the payload, initiate retraction of the assembly, and cause the bystander communication module to generate a message that indicates that the payload has been delivered. In response to determining that the assembly is beyond the reachable distance from the ground, the control system may cause the speed of ascension of the assembly to the UAV to increase.

The sensors that inform such determinations by the control system may include altimeters and/or accelerometers mounted on the retractable assembly; altimeters, accelerometers, tether tension sensors, encoders monitoring the length of the tether reeled out and/or thrust sensors mounted on the UAV. In addition, the assembly and/or UAV may have a downward facing ranging system, such as a laser ranging system or the like that actively senses the distance to the ground based on reflected radiation. In addition, the control system may have access to databases storing mapping and/or topographic information that associate geographic mapping coordinates to ground elevations at those coordinates.

II. EXAMPLE SYSTEM FOR DELIVERING A PAYLOAD FROM A HOVERING UAV

Figure 1A:
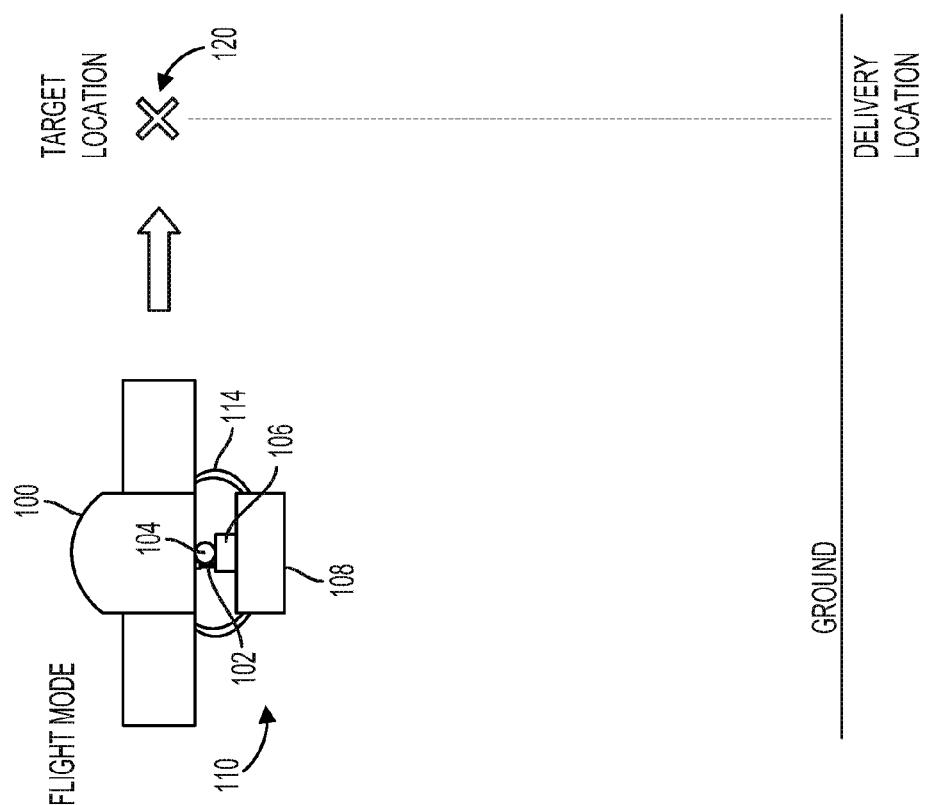

FIGS. 1A and 1B show a UAV 100 that includes a payload delivery system 110, according to an example embodiment. As shown, payload delivery system 110 for UAV 100 includes a tether 102, a tether-deployment mechanism 104, and a payload-release assembly 106 coupled to the tether 102. The payload-release assembly 106 can function to alternately secure a payload 108 and release the payload 108 upon delivery. The tether-deployment mechanism 104 can function to unreel and retract the tether 102 such that the payload-release assembly 106 can be lowered to the ground and retracted back to the UAV 100. The payload 108 may itself be an item for delivery, and may be housed within (or otherwise incorporate) a parcel, container, or other structure that is configured to interface with the payload-release assembly 106. In practice, the payload delivery system 110 of UAV 100 may function to autonomously lower payload 108 to the ground in a controlled manner to facilitate delivery of the payload 108 on the ground while the UAV 100 hovers above.

As shown in FIG. 1A, the payload delivery system 110 may function to hold the payload 108 against or close to the bottom of the UAV 100, or even inside the UAV 100, during flight from a launch site to a target location 120. The target location 120 may be a point in space directly above a desired delivery location. Then, when the UAV 100 reaches the target location 120, the UAV's control system may operate the tether-deployment mechanism 104 such that the payload 108, secured by the payload-release assembly 106, is suspended by the tether 102 and lowered to the ground, as shown in FIG. 1B. In an example, a control system detects that the payload 108 has been lowered to a point where it is at or near the ground (e.g., at the delivery location), the control system may responsively operate the payload-release assembly 106 to release the payload 108, and thereby detach the payload 108 from the tether 102. As such, the UAV's control system may use various types of data, and various techniques, to determine when the payload 108 and/or payload-release assembly 106 have lowered to be at or near the ground. Further, the data that is used to determine when the payload 108 is at or near the ground may be provided by sensors on UAV 100, sensors on the tether 102, sensors on the payload-release assembly 106, and/or other data sources that send data to the UAV control system.

A. Tether

In practice, the tether 102 used to suspend the payload-release assembly 106 (and payload 108) from the UAV 100 may be formed from a variety of materials. The tether 102 may include, for example, high tensile-strength polymeric fibers, metallic and/or synthetic cables, and other materials that exhibit relatively high tensile-strength per unit weight. The tether 102 may also be selected, at least in part, to be a material that is suitable for interfacing with the tether-deployment mechanism 104. In some examples, the tether 102 may also be operable for transmitting information between the payload-release assembly 106 and the UAV 100. For instance, the tether 102 may include, or be coupled to, a data-transmission wire formed of a conductive material (e.g., for conveying data-encoded electrical signals) and/or a fiber optic line (e.g., for conveying data-encoded optical signals).

B. Tether-Deployment Mechanism

In an example the tether-deployment mechanism 104 may include or take the form of a winch that is configured to deploy the tether with a payload attached thereto (e.g., via the payload-release assembly 106). Such a winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the payload 108 should be lowered towards the ground. The servo may then control the winch so that it operates at a desired rate. In addition, the winch can be used to retract the tether 102 and the payload-release assembly 106 attached thereto following delivery of the payload 108. Thus, the winch may function to reverse its direction of rotation to achieve retraction.

In some cases, the tether-deployment mechanism 104 may incorporate or be associated with an encoder that senses rotation of the spool letting out (or reeling in) the tether. Data from such an encoder can then be used by a control system of the UAV 100 to help in determining the distance between the payload 108 and the ground as the payload 108 is being lowered.

In addition, the tether-deployment mechanism 104 may vary the rate at which the payload 108 is lowered to the ground or the rate at which the payload-release assembly 106 is retracted back to the UAV 100. For example, a microcontroller may change the desired rate of lowering and/or retraction according to a variable rate profile and/or in response to other factors in order to change the rate at which the payload 108 descends towards the ground. To do so, the tether-deployment mechanism 104 may adjust the amount of braking or the amount of friction that is applied to the tether. For example, to vary the deployment rate, the tether-deployment mechanism 104 may include friction pads that can apply a variable amount of pressure to the tether. As another example, a line-deployment mechanism 104 can include a motorized braking system that varies the rate at which a spool unwinds the tether 102 during lowering, or reels in the tether 102 during retraction, by making adjustments to a motor speed (e.g., RPM) or gearing applied to the motor. Other examples are also possible.

In some examples, the tether-deployment mechanism 104 may be attached to the payload-release assembly 106, which is lowered with the payload 108, rather than being secured to a housing of the UAV 100. For example, a winch could be attached to the top of the payload-release assembly 106. In such an example, the winch may be operable to hold the payload-release assembly 106 (and the payload 108) at or near the bottom of the UAV 100 during flight to the delivery location. Then, upon arriving at the delivery location, the winch may function to lower the payload 108 by releasing the tether 102 and/or using a brake to adjust the rate at which the tether 102 is released in accordance with a variable rate. Moreover, in an example that omits the payload-release assembly 106, such a top-mounted winch may be mounted directly to the payload 108.

C. Payload-Release Assembly

The payload-release assembly 106 may take different forms in different implementations. In some examples, the payload-release assembly 106 may be a device includes electromechanical components that can secure a payload and release the payload. The device can be connected to a UAV by a tether, and a winch on the UAV can reel and unreel the tether to raise and lower the device. The device also includes sensors such as an accelerometer and/or an altimeter, that can be used to determine the position and/or altitude of the device. During a delivery operation, the UAV hovers over a delivery location and the device is lowered from the UAV using the winch. As the device is being lowered from the UAV, the payload is secured to the device. The sensors on the device communicate sensor measurements to the UAV through a wireless communication link. A control system on the UAV determines when the device, and the payload, have reached the ground based on the sensor measurements and causes the device to release the payload. The device is then retracted back to the hovering UAV using the winch and the payload is left behind at the delivery location. As used herein, such device may be referred to as the payload-release assembly 106.

In some embodiments, the payload 108 and/or payload-release assembly 106 may be designed with features that help to prevent the payload 108 and/or the payload-release assembly 106 from getting stuck or caught during descent (e.g., to prevent getting caught and/or tangled in a tree or on a power line). For instance, the payload 108 and/or payload-release assembly 106 may take the form of or be housed in a teardrop-shaped housing, or another shape that can incorporates surfaces that move obstacles aside so as to allow the payload-release assembly 106 to be more easily moved up and down by the tether 102 without getting stuck.

The payload-release assembly 106 can also include one or more sensors and a communication interface to allow data from the sensors to be sent to a control system on the UAV 100 or associated with the UAV 100. The payload-release assembly 106 may include, for example, accelerometers or other inertial motion sensors, an altimeter, such as a pressure sensor, an imaging system, and/or an active ranging system. Data from the sensors on the payload-release assembly 106 can then be used to estimate the altitude and/or position of the payload-release assembly 106 as it is lowered to the ground. For example, the accelerometer data and/or altimeter data can be used to determine how far the payload-release assembly 106 (and the payload 108) have been lowered using the tether 102, and thus how much distance remains to the ground. In addition, data from the accelerometer may be used to detect a collision with the ground by the payload-release assembly 106 and/or the payload 108. Such a collision event may be indicated by the accelerometer data as an abrupt deceleration event with a characteristic signature, for example. Information from such sensors can then be communicated to the UAV 100 over a wireless communication link and/or by transmitting signals through the tether 102.

The payload-release assembly 106 may include grippers, fasteners, or other engaging surfaces that function to secure the payload 108 (e.g., by applying pressure to the payload 108 or by engaging corresponding surfaces of the payload 108). In some cases, the payload 108 may include one or more apertures or other standardized interfacing features configured to interface with the payload-release assembly 106. Thus, the payload-release assembly 106 may include prongs or the like that interface with the payload 108 by passing through the payload's apertures (or otherwise engaging standardized features). The payload-release assembly 106 can also release the payload 108 by disengaging the grippers or engaging surfaces, or by detaching from the payload's standardized features.

In some cases, the payload-release assembly 106 is operable to alternate between securing the payload 108 and releasing the payload 108 by actuating one or more mechanical components that interface with the payload 108. Such actuating mechanical component(s) can take a variety of forms. For instance, the payload-release assembly 106 may include opposable arms. The opposable arms can be used to grip the payload 108 while lowering the payload 108 from the UAV 100, and then can be opened to release the payload 108 once the payload 108 is on the ground. The payload-release assembly 106 may also take the form of a container, bucket, cage, or other enclosure with a bottom that can be opened. While the payload 108 is lowered from the UAV 100, the payload 108 can be secured within the enclosure, and then the bottom of the enclosure can be opened once payload 108 is on the ground, which allows the enclosure to be retracted back to the UAV 100 while the payload 108 remains on the ground. In another example, the payload-release assembly 106 may include an engaging rod or hook that engages a corresponding depression or aperture in the payload 108. For example, the payload 108 may be formed to include one or more loops along its top or side surfaces. To secure the payload, the rod(s) or hook(s) of the payload-release assembly 106 can be maneuvered to engage such loops. Similarly, the payload can be released by manipulating the rod(s) or hook(s) to disengage the loops.

Various other types of payload-release assemblies are also possible. The form of a payload-release assembly for a particular implementation may depend on, for example, the types of payloads to be delivered and the environmental conditions in which delivery will be made. For example, the payload-release assembly 106 may be positioned on the tether 102 or at the top of the tether 102, and may be operable to cut the tether or release the tether from the UAV 100 when the payload 108 is at or near the ground. Other examples are possible.

When the payload-release assembly 106 includes sensors, communication systems, electromechanical features, and/or other aspects that consume electrical power, the payload-release assembly 106 can also include a power supply. The power supply may include a battery and/or a capacitive device, for example. The power supply may also be recharged by an electrical contact with the UAV 100 while the payload-release assembly 106 is secured to the UAV 100 (e.g., during flight mode operations of the UAV). For example, the payload-release assembly 106 may include one or more electrical contacts that interface with corresponding terminals on the UAV 100 when the payload-release assembly 106 is seated against the UAV 100. A battery within the payload-release assembly 106 can then be recharged via the electrical connection.

Moreover, in some examples, such an electrical connection between the payload-release assembly 106 and the UAV 100 may be facilitated by the payload-release assembly 106 including an asymmetric surface that is received within a corresponding mating surface of the UAV 100 (e.g., a relief of the asymmetric surface). As the payload-release assembly 106 is being retracted toward the UAV 100, the asymmetric surface can interface with the mating surface to cause the payload-release assembly to rotate to a particular orientation at which the asymmetric surface is aligned with the mating surface. By ensuring the payload-release assembly 106 becomes seated against the UAV 100 in a repeatable orientation, the electrical contacts/terminals between the assembly 106 and the UAV 100 can be aligned for electrical connection. In addition, the electrical connection interface may include guide pins and corresponding receiving channels to facilitate self-alignment of the electrical contacts as the payload-release assembly 106 approaches the UAV 100. Additionally or alternatively, the electrical contacts/terminals may be arranged to be at least partially rotation insensitive. For example, a top surface of the payload-release assembly may be cylindrically symmetric (e.g., a conical surface) and be received into a corresponding mating surface on the UAV. The contacts/terminals may include cylindrically symmetric conductive rings at respective radii of the two cylindrically symmetric mating surfaces. Other examples of self-aligned and/or rotation insensitive electrical and/or communication terminals between the payload-release assembly 106 and the UAV 100 are also possible.

In some cases, the payload-release assembly may additionally or alternatively be powered via electrical signals carried over the tether 102 (or another conductive linkage between the UAV 100 and the payload-release assembly 106).

Further, in some implementations, the payload delivery system 110 may omit the payload-release assembly 106. For example, the payload itself may incorporate a rolling mechanism that traverses the tether 102 and simply rolls off the end of the tether 102 upon reaching the end, thereby releasing the payload 108 from the UAV 100.

D. Control System

The UAV 100 may include a control system to provide various functions described herein. The control system may include or take the form of program instructions stored in a non-transitory computer-readable medium and may also include a variety of functional modules implemented by software, firmware, and/or hardware.

The control system may be configured to autonomously navigate the UAV 100 toward a specified destination. For example, the control system may determine a set of flight-command instructions that cause propulsion systems of the UAV 100 to operate such that the UAV flies through a set of waypoints that define a route to the specified destination. Among other factors, the control system may plan routes based on information from other aerial vehicles (or control systems therefore) and/or based on pre-determined guidance regarding allowable routes, altitudes in particular regions, etc. The control system may also be configured to operate the payload delivery system 110 to controllably lower the payload 108 to the ground, release the payload 108, and then retract the payload-release assembly 106 back to the UAV 100. Thus, the control system can function to regulate the operation of a variety of actuators, servo controls, and other electromechanical devices that are involved in the operation of the payload delivery system 110.

The control system of UAV 100 may also intelligently control the payload-release assembly 106 to release the payload 108 at or near the ground. For example, the control system may trigger the payload-release assembly 106 to release the payload 108 after a certain length of the tether 102 has been let out by the tether-deployment mechanism 104, such that it is expected that the payload 108 is on the ground, or near enough to the ground that it can safely drop to the ground. The control system may also receive sensor data from an accelerometer on the payload-release assembly 106, and determine that the payload 108 is on the ground when the accelerometer data indicates that the payload had an impact with the ground. Other examples are also possible in which the control system can function to determine that the payload 108 is at or near the ground and then responsively cause the payload-release assembly 106 to release the payload 108.

The length of the tether 102 that has been let out by the tether-deployment mechanism 104 may also be used to determine the distance between the payload 108 and the ground (i.e., the altitude of the payload 108). More specifically, given the height of the payload 108, the height of the payload-release assembly 106, the length of the tether 102, and the altitude difference between the top of the line 102 and the point where altitude is measured by the UAV 100, the UAV 100 may determine the distance between the bottom of the payload 108 and the ground. Thus, the distance between the payload 108 and the ground can be updated as the line 102 is deployed to, e.g., determine when to change the deployment rate of line 102 in accordance with a given variable deployment rate profile. In some cases, the control system can operate the payload delivery system 110 such that the rate of descent of the payload 108 is altitude dependent. For example, the control system can initially allow the payload 108 to descend at a maximum rate of descent. The control system can monitor information from sensors indicating the descending altitude of the payload 108, and upon detecting that the payload 108 is within a particular distance of the ground, the control system can cause the tether-deployment mechanism 104 to begin slowing the descent of the payload 108. The control system may cause the rate of descent to slow to a predetermined safe speed by the time the payload 108 is near enough to the ground that it could interfere with (or be grabbed by) objects or people on the ground. Similarly, the control system may also cause the payload-release assembly 106 to ascend back to the UAV 100 in an altitude-dependent manner after releasing the payload 108.

E. Example Payloads

The payload 108 may be a standardized container or parcel that includes one or more features configured to interface with the payload-release assembly 106. For instance, the payload 108 may include one or more loops, indentations, tabs, anchor points, or other structural features arranged to be engaged by corresponding components of the payload-release assembly 106. In some cases, the standardized features of the payload 108 may be integrated in a packaging module (e.g., a reusable or disposable container), and the packaging module may house (or be fastened to) one or more items that are being delivered using the UAV 100. Such items may include food, medical equipment or supplies, or any other retail goods that may be delivered by a delivery service or relief items that may be supplied to stranded or isolated people in an emergency or rescue scenario. In some cases, the payload 108 may also include an identifying element to facilitate recognition, and differentiation, of the payload from other payloads when being sorted and handled. The identifying element may include an RFID tag or an optically scanned linear or two-dimensional barcode. The identifying element can then be associated with information regarding the particular payload in a database that can be accessed by various systems used in handling/sorting payloads, and in loading the UAV 100. For example, such a database may associate the identifying element with contents of the payload, delivery destination, and/or other information pertaining to the particular payload and its delivery. Systems interfacing with a given payload can then scan its identifying element and retrieve the information from the database that relates to the given payload.

In some examples, the payload 108 may take the form of a container that includes medical-support devices and/or other items intended to help in a medical situation. In other examples, the payload 108 may itself be a medical-support device (e.g., a defibrillator) or another type of medical support item, such as a pharmaceutical medicine. Generally, the payload 108 may be any type of item to be delivered, including non-medical items such as goods ordered from a non-medical delivery service or items shipped through a shipping service.

F. Emergency-Release System

In yet a further aspect, a UAV 100 may include an emergency system (not shown in the Figures), which is configured to cut or release the tether 102. In particular, the UAV 100 may be configured to detect certain emergency situations, such as the tether 102, payload-release assembly 106, and/or payload 108 becoming stuck (e.g., in a tree), and to automatically cut the tether 102 when such an emergency situation is detected. The emergency situation may also involve the tether 102 and/or payload-release assembly 106 being grabbed by an individual on the ground. By cutting the tether 102 in such emergency situations, the UAV 100 functions to prevent damage to or from the UAV 100 (e.g., caused by the UAV 100 being pulled to the ground).

Various types of emergency-release mechanisms are possible, which may be configured to cut the tether 102 holding the payload 108 and/or payload-release assembly 106 or otherwise release the tether 102 from the UAV 100. In one example, the emergency-release mechanism may include a blade mounted on a cartridge that can be propelled through a firing cylinder by igniting a chemical explosive or propellant. The firing cylinder can be mounted on the UAV near the tether-retraction mechanism 104 (e.g., winch) such that, when fired, the blade severs the tether 102 and thereby disconnects the unreeled tether 102 (and payload-release assembly 106) from the UAV Further, various types of data may be analyzed to determine if and when an emergency-release mechanism should be used to release the payload. The control system can function to determine that such an emergency situation has occurred based on data from sensors on the UAV 100 and/or the payload-release assembly 106. For example, the UAV's control system could analyze image data from a camera, data from a line-tension sensor, data from sensors monitoring thrust exerted by the UAV's propulsion systems, and/or other types of data to determine that the payload and/or payload-release assembly is stuck, has been interfered with, or that deployment of the payload has otherwise failed. Upon determining that an emergency situation has occurred, the control system can responsively use the emergency-release mechanism to release the payload 108 (and the payload-release assembly 106). In some cases, the control system may receive an indication of the emergency situation from a remote terminal where a supervisory control operator is monitoring sensor data and has determined that the tether 102 should be cut (e.g., based on analyzing a video feed from imaging system(s) associated with the UAV 100).

G. Other Aspects

In some examples, the UAV 100 may include features that can hold the payload 108 in place and/or stabilize the payload during flight. Such features may be mechanically adjustable such that the tether-deployment mechanism 104 can lower the payload 108 upon arriving at the delivery location. For instance, in the configuration shown in FIG. 1A, UAV 100 includes moveable retaining brackets 114. The brackets 114 may interface with the payload 108 and/or assembly 106 to hold the payload 108 in place during flight, as shown in FIG. 1A. And when UAV 100 reaches the delivery location, the brackets 114 may be moved away from payload 108, so that the payload 108 can be lowered without interference from the brackets 114. Note that other types of mechanisms may also be used to hold the payload 108 in place and/or to stabilize the payload 108 during flight. Moreover, the payload 108 may be held in place during flight by the assembly 106, without use of any additional features.

In some examples, a UAV 100 may additionally or alternatively be configured to pick up items from the ground using the payload delivery system 110 shown in FIGS. 1A and 1B, or a different type of system.

III. EXAMPLE BYSTANDER COMMUNICATION MODULE

Figure 2A:
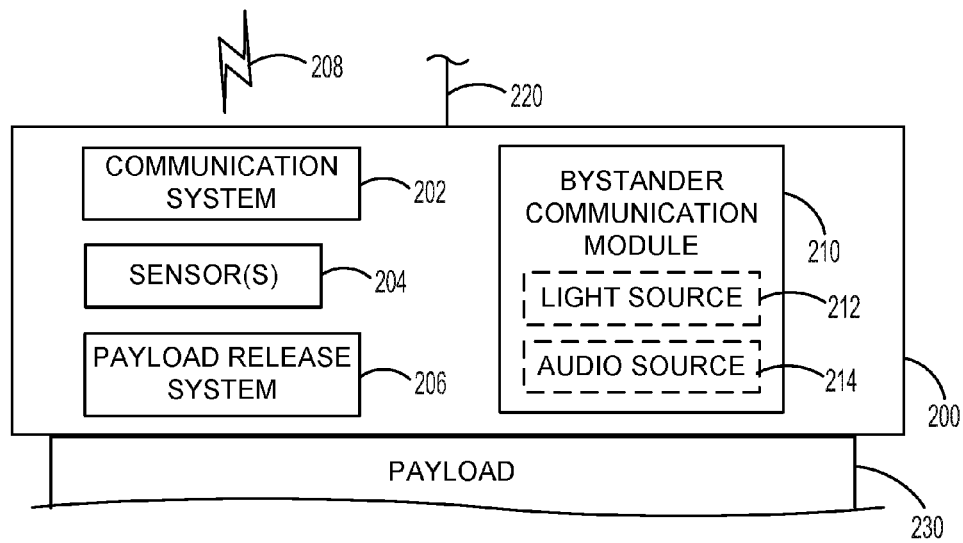
FIG. 2A illustrates an example payload-release assembly including a bystander communication module.

FIG. 2A illustrates an example payload-release assembly 200 including a bystander communication module 210. The payload-release assembly 200 can include a communication system 202, sensor(s) 204, a payload-release system 206, and the bystander communication module 210. Generally, the payload-release assembly 200 can be suspended from a UAV using a tether 220 and can function to alternately secure a payload 230 (e.g., during descent from the UAV) and release the payload 230 (e.g., upon reaching the ground). In many respects then, the payload-release assembly 200 can be similar to the payload-release assembly 206 described above in connection with FIGS. 1A and 1B. However, the payload-release assembly 200 also includes the bystander communication module 210, which is used to generate audible and/or visible cues for perception by people near a delivery location while the assembly 200 is raised and lowered. The various cues generated by the bystander communication module 200 are selected to facilitate safe, intuitive interactions between bystanders on the ground and a UAV delivery system.

The communication system 202 can be used to send and receive data between the payload-release assembly 200 and a UAV from which the assembly 200 is suspended. For example, the communication system 202 may be a wireless communication system that sends and receives data-encoded electromagnetic transmissions using an antenna to create a wireless data link 208 with the UAV.

The sensor(s) can include one or more systems that generate data indicative of the altitude, position, and/or status of the payload-release assembly 200 and/or the payload 230. The sensor(s) 204 may include inertial motion sensor (e.g., accelerometers and/or gyroscopes) that function to generate data indicative of rotational and/or translational motion of the payload-release assembly 200. The sensor(s) 204 may additionally or alternatively include an altitude sensor, such as a barometric altimeter that functions to measure the local atmospheric pressure, which can be used to estimate the altitude. The sensor(s) may additionally or alternatively include an active ranging system such as a laser ranging system or radio ranging system that estimates the distance to the ground based on time of flight of reflected radiation transmitted by the payload-release assembly 200 and reflected from the ground. Similarly, such active ranging systems may function to estimate the distance to the UAV from which the payload-release assembly 200 is suspended.

The sensor(s) 204 may additionally or alternatively include imaging system(s) that function to capture image data or video from a camera mounted on the payload-release assembly 200. The imaging system(s) may include, for example a pair of cameras that can be used to estimate the distance to the ground stereoscopically, for instance, by focusing the two spatially separated cameras on a common ground feature and determining distance based on the angle between the cameras. Other sensors may include proximity sensors and/or encoders that function to provide an indication of whether the payload 230 is secured to the payload-release assembly 200, or disconnected. The sensor(s) 204 function to generate sensor data indicative of the various parameters they are configured to measure, and the sensor data can then be provided to the UAV (via the communication system 202) or to a control system included on the payload-release assembly 200.

In some examples the sensor(s) 204 may include, or function in cooperation with, components on the UAV. For example, a position tracking system may include an upward-facing light source and/or reflector mounted on the payload-release assembly 200, and a downward-facing imaging system mounted on the UAV. The imaging system can track the position of the suspended payload-release assembly 200 by tracking the location of the upward-facing light source and/or reflector in the field of view of the imaging system. For instance, the upward-facing light source may emit light in a narrow wavelength range (e.g., a light emissive diode) and the imaging system may include a corresponding narrow band filter that passes the emitted light so as to decrease interference from other light and thereby help track the position of the payload-release assembly 200. In order to associate a physical position with the captured image of the upward-facing light source, the imaging system may be mounted on a stabilizing mount, such as a three-dimensional gimball mount, so as to substantially fix an orientation of the imaging system with respect to the orientation of the UAV and/or the ground.

The payload-release assembly 200 also includes a payload-release system 206, which can include one or more electromechanical components that can be manipulated to alternately secure the payload 230 or release the payload 230. Thus, the payload-release system 206 can include one or more gripping surfaces, retaining rods, clamps, or other components that can be actuated via electronically generated signals to either couple the payload-release assembly 200 to the payload 230 or release the payload 230 from the payload-release assembly 200.

The bystander communication module 210 can include one or more human interface modules configured to generate cues perceptible to people on the ground. For example, as shown in FIG. 2A, the bystander communication module 210 may include a light source 212 and/or an audio source 214. The light source 212 may include one or more individual light emissive elements, such as light bulbs, light emissive diodes, or another light source and suitable optical systems therefore. For instance, the light source 212 may include red, yellow, and/or green lights and lenses/mirrors configured to cause the emitted light to flash or rotate. The light source 212 may additionally or alternatively include a pixelated display panel on which color and/or black/white messages or images can be rendered. For instance, the light source 212 may include a display panel of emissive or transmissive elements on which scrolling text messages can be rendered. The audio source 214 may include a loudspeaker(s) that function to output sound waves for perception by people on the ground.

Additionally or alternatively, the bystander communication module 210 may include one or more components that are not arranged on the payload-release assembly 200. For example, the UAV itself may be equipped with one or more downward-facing light sources and/or audio loudspeakers for generating visible and/or audible cues that can be perceived by people on the ground. Moreover, the bystander communication module 210 may include (or operate in cooperation with) user interface features that can be held by, or worn by, people on the ground. For example, the UAV delivery system may send and receive messages to various electronic devices associated with people on the ground (e.g., phones, wearable computing devices, tablets, computers, or other electronic devices including user interface components). Such messages may be addressed to people associated with the particular delivery taking place, such as a person that placed an order for the delivery, or may be addressed to individuals based on their proximity to the target delivery location. For instance, a message may be broadcast to electronic devices in a given proximity range of the delivery location, and that message can cause those electronic devices to display or otherwise provide perceptible cues to people associated with those devices via their respective user interfaces.

Figure 2B:
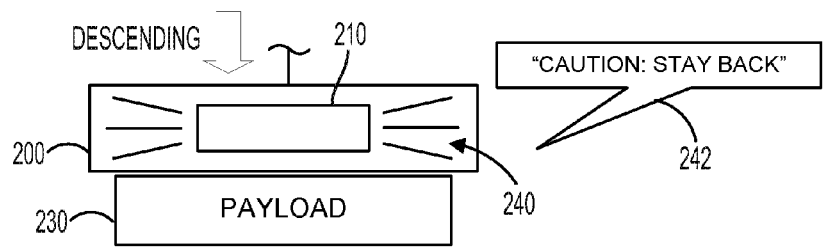
FIG. 2B illustrates the example payload-release assembly shown in FIG. 2A generating an avoidance cue.

FIG. 2B illustrates the example payload-release assembly 200 shown in FIG. 2A generating an avoidance cue. In FIG. 2B, the payload-release assembly 200 and the payload 230 secured thereby are being lowered from a UAV while suspended by the tether. During descent, the bystander communication module 210 emits an avoidance cue 240. The avoidance cue 240 may include visible signals, audible signals, or a combination thereof. For example, the avoidance cue 240 may include a loudspeaker emitting audible content of a recorded spoken voice (or text-to-speech generated voice) saying "Caution: Stay Back," as represented by the text window 242 in FIG. 2B. In some examples, the avoidance cue 240 may include audible content that includes a recording of other spoken words (e.g., "Delivery In Progress"), or may include non-spoken or non-verbal audible content. For instance, the avoidance cue 240 may include audible content of a beeping sound or a siren, such as a sound associated with a large vehicle operating in reverse, or another sound associated with exercising caution. The avoidance cue 240 may additionally or alternatively include visible content such as a flashing, rotating, or continuous light (e.g., a rotating or flashing red or yellow light) or a display panel or pixelated array that displays fixed or scrolling text. For instance, a display panel may display scrolling text that reads "Caution: Stay Back," or another message. Such a display may also render caution symbols, stop-sign symbols, and/or warning symbols.

The avoidance cue 240 may be selected to provide an intuitive cue to people on the ground during a delivery operation (i.e., bystanders) that causes those people to exercise caution and avoid interfering with the payload-release assembly 200, the tether 220, and/or the payload 230. In practice, bystanders may or may not have prior experience with a UAV delivery system, and so the UAV avoidance cue 240 may be selected to rely in part on substantially universally understood indications of caution and/or avoidance. For instance, the avoidance cue 240 may be based in part on traffic symbols or indications associated with exercising caution, such as those used surrounding construction zones or school crossings or the like. In some examples, the avoidance cue 240 may be selected based in part on empirical results of trials in which various cues are used during actual or simulated deliveries from UAV delivery systems and the behavior of untrained bystanders are observed. Cues that cause such bystanders to intuitively avoid making contact with the payload-release assembly 200 can then be selected as the avoidance cue 240.

Figure 2C:
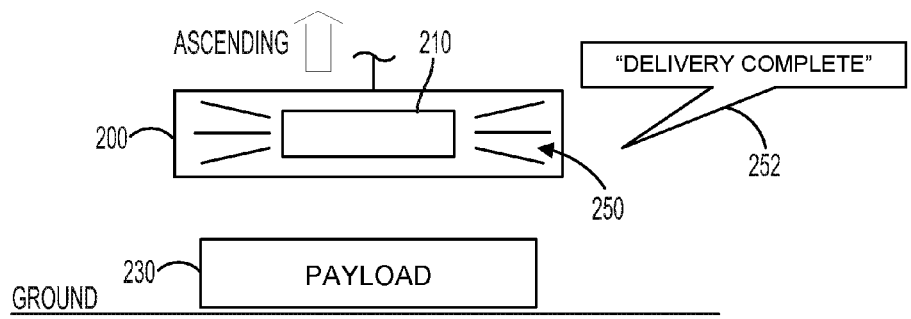
FIG. 2C the example payload-release assembly shown in FIG. 2A generating a retrieval cue.

FIG. 2C illustrates the example payload-release assembly 200 shown in FIG. 2A generating a retrieval cue. In FIG. 2C, the payload-release assembly 200 is being retracted back to the UAV via the tether 220, and the payload 230 has been released from the payload-release assembly 200 and is resting on the ground. After releasing the payload 230 on the ground, the bystander communication module 210 emits a retrieval cue 250. The retrieval cue 250 may include visible signals, audible signals, or a combination thereof. For example, the retrieval cue 250 may include a loudspeaker emitting audible content of a recorded spoken voice (or text-to-speech generated voice) saying "Delivery Complete," as represented by the text window 252 in FIG. 2C. In some examples, the retrieval cue 250 may include audible content that includes a recording of other spoken words (e.g., "Please Retrieve Your Parcel"), or may include non-spoken or non-verbal audible content. For instance, the retrieval cue 250 may include audible content of a chime or bell, such as a sound associated with completion of a task, for example, in computer user interface systems. The retrieval cue 250 may additionally or alternatively include visible content such as a flashing, rotating, or continuous light (e.g., a continuous green or blue light) or a display panel or pixelated array that displays fixed or scrolling text. For instance, a display panel may display scrolling text that reads "Delivery Complete," or another message. Such a display may also render various symbols associated with task completion or which invite bystanders to approach.

The retrieval cue 250 may be selected to provide an intuitive cue to people on the ground during a delivery operation (i.e., bystanders) that causes those people to recognize, in response to the retrieval cue 250, that they are now permitted to approach the payload 230 and retrieve it from the ground. In practice, bystanders may or may not have prior experience with a UAV delivery system, and so the UAV retrieval cue 250 may be selected to rely in part on substantially universally understood indications of completion and/or retrieval. For instance, the retrieval cue 250 may be based in part on traffic symbols or indications associated with task completion, such as green lights, etc. In some examples, the retrieval cue 250 may be selected based in part on empirical results of trials in which various cues are used during actual or simulated deliveries from UAV delivery systems and the behavior of untrained bystanders are observed. Cues that cause such bystanders to intuitively understand, in response to the cue, that it is now safe form them to approach the payload 230 and retrieve it from the ground can then be selected as the retrieval cue 250.

In some examples, the re-usable payload-release assembly 200 that is retracted back to the UAV may be omitted entirely. Instead, some or all of the functionality described in connection with the payload-release assembly 200 (e.g., communication of sensor data and generation of such data, bystander communication) may instead be performed in whole or in part by the payload itself. The payload may be releasably secured to the tether directly or via an attachment mechanism that can be electromechanically actuated. In such examples, for instance, each payload can be equipped with sensors, wireless communication systems, and bystander interface components. Such subsystems may be integrated into standardized packaging that houses items to be delivered therein, and may perhaps be reusable or recyclable (e.g., by delivery customers returning the packaging to a predetermined location). The UAV's control system can then receive sensor data indicating the descending payload's position, determine when the payload is at or near ground level, and then cause the payload to be uncoupled from the tether. In addition, the UAV's control system may communicate with the payload to cause the payload to generate avoidance and/or retrieval cues similar to the description above (e.g., the payload may generate an avoidance cue while being lowered, and then generate a retrieval cue after being uncoupled from the tether). Because the retractable delivery system 210 may or may not include both the assembly 200 and the payload 230, some examples described herein may refer instead to a descending apparatus, which may be either a reusable payload-release assembly and a payload secured thereto, or a payload that is operable to perform at least some of the functionality described above in connection with the payload-release assembly 200.

IV. EXAMPLE OPERATIONS

Figure 3A:
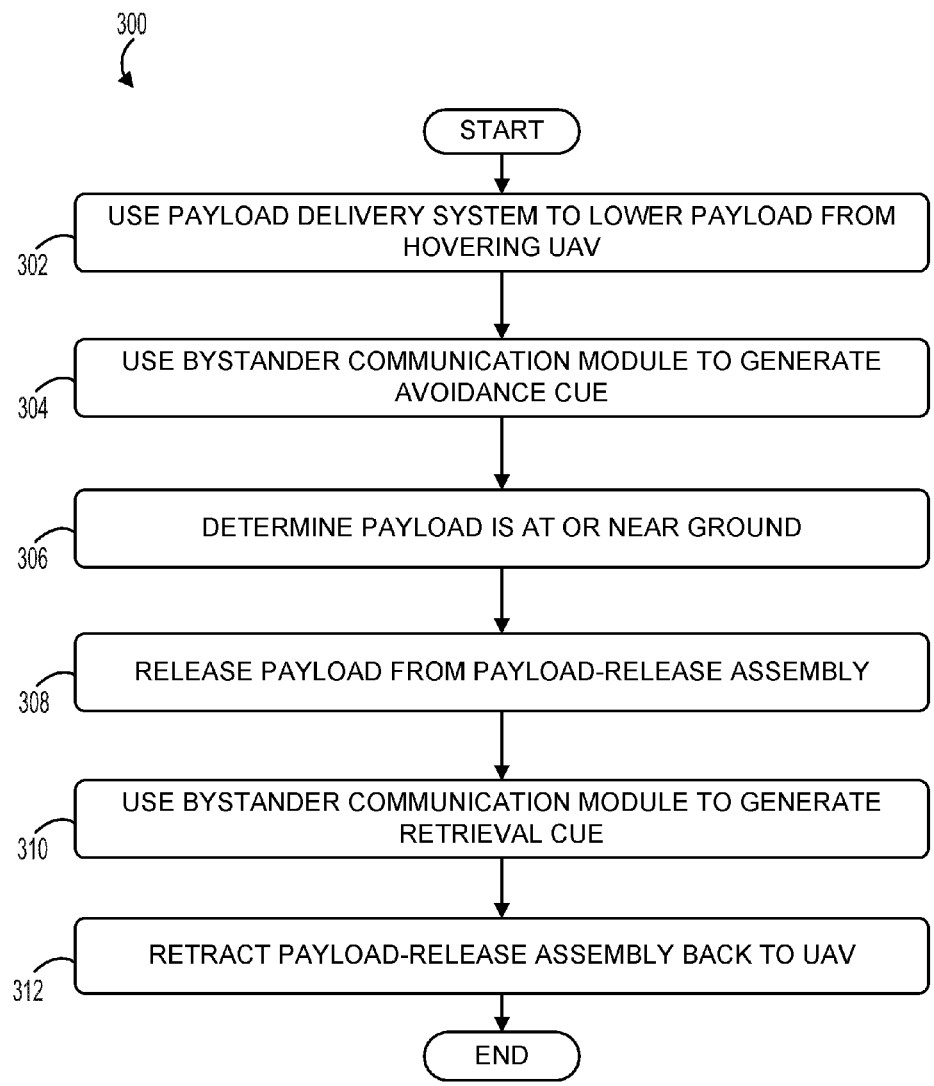
FIGS. 3A and 3B are flow charts illustrating processes that may be performed by a UAV, according to an example embodiment.
Figure 3B:
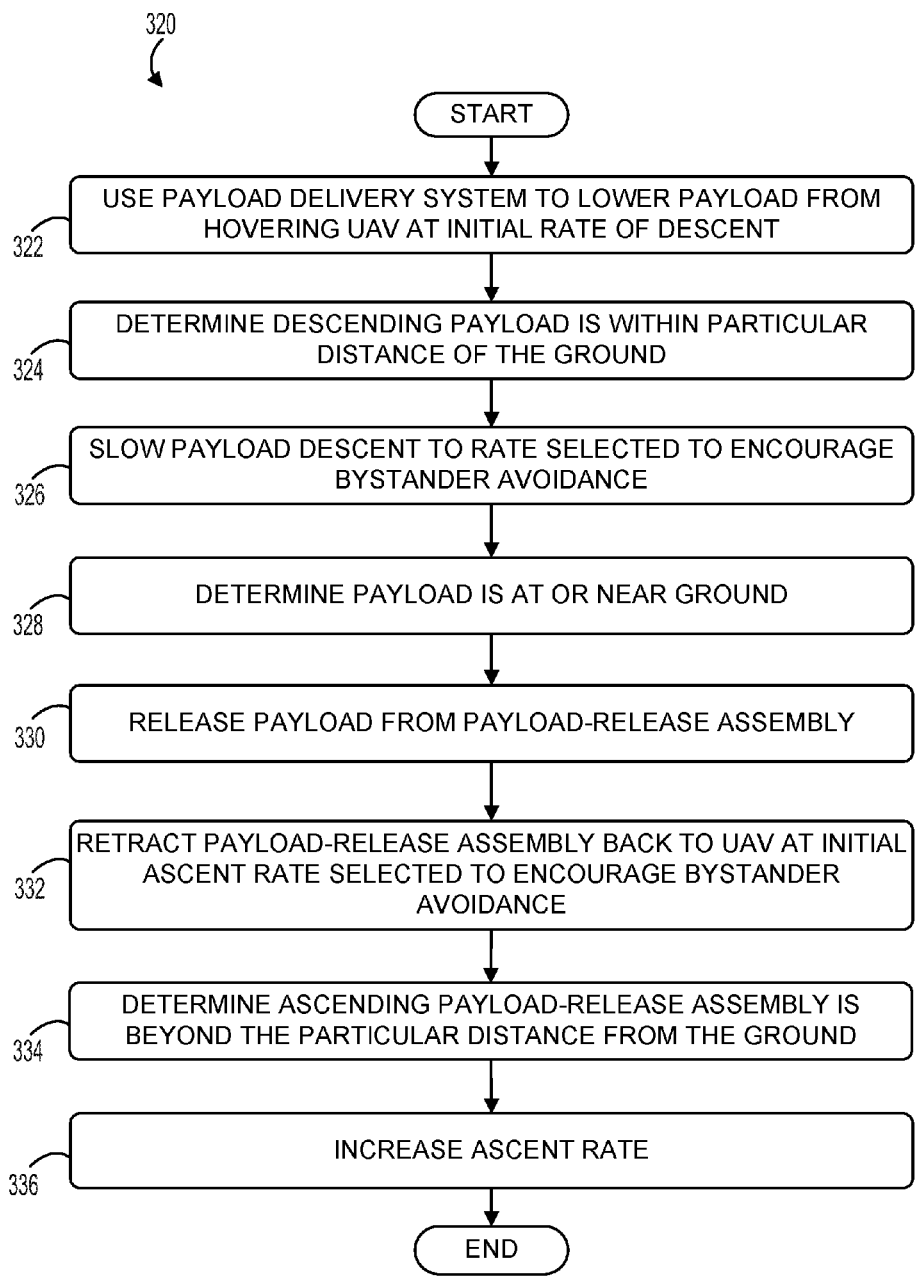

FIGS. 3A and 3B are flow charts illustrating processes that may be performed by a UAV, according to an example embodiment. FIG. 3A is a flow chart of a process 300 in which a bystander communication module is used to encourage bystanders to interact with the UAV delivery system in a safe, intuitive manner. In particular, the bystander communication module generates cues that encourage bystanders to avoid making contact with the payload while it is descending to the ground and suspended from the UAV by the tether.

A. Bystander Communication Module

At block 302, a payload delivery system is used to lower a payload from a hovering UAV. For example, the UAV may be hovering at a target location above a target delivery location on the ground. The UAV can then use its retractable delivery system to lower the payload secured to the payload-release assembly and coupled to the UAV via the tether.

At block 304, the bystander communication module on the payload-release assembly is used to generate an avoidance cue. For example, while the payload is descending from the UAV, and perhaps once it is within a particular distance from the ground, the bystander communication module on the payload-release assembly can begin emitting visible and/or audible signals for perception by people on the ground, which cause those people to exercise caution and avoid interference with the descending assembly. In some cases, the bystander communication module may additionally or alternatively include components that are mounted on the hovering UAV, rather than the payload-release assembly (e.g., downward-facing light source(s) and/or speaker(s)). Example avoidance cues are described above in connection with FIG. 2B.

At block 306, the payload is determined to be at or near the ground. The determination may be made by a computing control system on the payload-release assembly or the UAV (or associated with the UAV). The determination may be based, at least in part, on sensor data from sensors on the payload-release assembly or the UAV. For example, data from inertial motion sensor(s) included in the payload-release assembly can be analyzed to determine whether such data indicates that the payload and/or payload-release assembly underwent an impact with the ground. Upon detecting one or more decelerations characteristic of a ground impact, the computing system(s) can determine that the payload is at or near the ground. Additionally or alternatively, the determination may be made in part based on altimeter sensor data, imaging data, tether reel encoder data, tether-tension sensor data, and/or UAV thrust sensor data. The tether-tension sensor data and/or UAV thrust sensor data can be used, for example, to determine the amount of weight suspended from the UAV by the tether. A sudden decrease in the amount of suspended weight may thus indicate that the payload is on the ground. Other techniques for detecting that the payload is at or near the ground are described above in connection with FIG. 1.

At block 308, the payload can be released from the payload-release assembly. For example, the payload-release assembly may actuate one or more electromechanical components so as to disengage the payload-release assembly from the payload.

At block 310, the bystander communication module on the payload-release assembly is used to generate a retrieval cue. For example, after the payload is released from the payload-release assembly, the bystander communication module on the payload-release assembly can begin emitting visible and/or audible signals for perception by people on the ground, which cause those people to understand that they may safely retrieve the payload from the ground. In some cases, the bystander communication module may additionally or alternatively include components that are mounted on the hovering UAV, rather than the payload-release assembly (e.g., downward-facing light source(s) and/or speaker(s)). Example retrieval cues are described above in connection with FIG. 2C.

At block 312, the payload-release assembly is retracted back to the UAV. For example, a tether-deployment mechanism, such as a winch or ratchet, can be actuated to reel in the tether. However, in examples in which the payload-release assembly functionality is integrated into the payload itself, the entire payload may be released from the tether and there may be nothing to retract back to the UAV except perhaps the unreeled tether.

B. Variable Descent/Ascent Rate

FIG. 3B is a flow chart of a process 320 in which a descent rate of a payload-release assembly (and payload secured thereby), and also an ascent rate of the retracting payload-release assembly are selected to encourage bystanders to interact with the UAV in a safe, intuitive manner. In particular, the descent/ascent rates are selected to encourage bystanders to avoid making contact with the payload while it is descending to the ground and suspended from the UAV by the tether.

At block 322, a payload delivery system is used to lower a payload from a hovering UAV. For example, the UAV may be hovering at a target location above a target delivery location on the ground. The UAV can then use its retractable delivery system to lower the payload secured to the payload-release assembly and coupled to the UAV via the tether. The payload delivery system can begin lowering the payload at an initial rate of descent. In some examples, the initial rate of descent can be a maximum allowable descent rate of the tether-deployment mechanism. Although the initial descent rate may also be limited based on the braking capability (e.g., deceleration rate) of the tether-deployment mechanism and a distance to ground level (or another altitude) at which point the payload will be slowed to another descent rate. In some cases, the initial descent rate and/or rate of change of descent may be subject to limitations on allowable acceleration forces that may be experienced by the payload-release assemblies payload-securing electromechanical components while continuing to safely secure the payload, or perhaps limitations on the acceleration that may be experienced by the payload itself (e.g., the payload may include fragile or breakable items). The initial descent rate may also be based on a determination of a maximally energy-efficient descent rate profile (e.g., a variable descent rate which maximizes the energy efficiency of the motor-driven winch that reels out the tether).

At block 324, the descending payload is determined to be within a particular distance of the ground. The determination may be made by a computing control system on the payload-release assembly or the UAV (or associated with the UAV). For example, the determination may be based, at least in part, on sensor data from sensor(s) on the payload-release assembly, such as an altimeter and/or an inertial motion sensor. The particular distance from the ground may be a height below which interference with obstacles and/or bystanders is considered more likely and thus the particular distance may be based in part on typical heights of objects and/or people. The particular distance may be, for example, about 10 to 15 feet above the ground (about 3 to 5 meters from the ground). In some examples, the particular distance from the ground can be based in part on an amount of distance required to slow the descent rate of the descending payload before it reaches the ground or another predetermined height from the ground at which obstacles are more likely to be encountered.

At block 326, the payload descent rate is slowed from the initial rate to a descent rate selected to encourage bystander avoidance. The selected descent rate may be a rate of descent that is sufficiently slow to mitigate causing injuries or damage should the payload and/or payload-release assembly contact people or objects. However, the selected descent rate may also be fast enough to discourage bystanders from approaching the descending payload or trying to catch it before it reaches the ground. As such, the selected descent rate may be faster than a slowest possible rate of descent. In some examples, the selected descent rate may be selected based in part on results from studies in which various descent rates are used during actual or simulated deliveries from a UAV delivery system and the behavior of untrained bystanders are observed. Speeds of descent which have a tendency to cause those bystanders to exercise caution and avoid interfering with, or otherwise making contact with, the descending payload can then be selected as the descent rate to use below the particular distance from the ground.

At block 328, the payload is determined to be at or near the ground. The determination may be made by a computing control system on the payload-release assembly or the UAV (or associated with the UAV). The determination may be based, at least in part, on sensor data from sensors on the payload-release assembly or the UAV. For example, data from inertial motion sensor(s) included in the payload-release assembly can be analyzed to determine whether such data indicates that the payload and/or payload-release assembly underwent an impact with the ground. Upon detecting one or more decelerations characteristic of a ground impact, the computing system(s) can determine that the payload is at or near the ground. Additionally or alternatively, the determination may be made in part based on altimeter sensor data, imaging data, tether reel encoder data, tether-tension sensor data, and/or UAV thrust sensor data. The tether-tension sensor data and/or UAV thrust sensor data can be used, for example, to determine the amount of weight suspended from the UAV by the tether. A sudden decrease in the amount of suspended weight may thus indicate that the payload is on the ground. Other techniques for detecting that the payload is at or near the ground are described above in connection with FIG. 1.

At block 330, the payload can be released from the payload-release assembly. For example, the payload-release assembly may actuate one or more electromechanical components so as to disengage the payload-release assembly from the payload.

At block 332, the payload-release assembly is retracted back to the UAV at an initial ascent rate selected to encourage bystander avoidance. For example, the tether-retraction mechanism, such as the winch or ratcheting mechanism, can engage the tether and begin reeling in the payload-release assembly toward the hovering UAV while the payload remains below on the ground. The selected ascent rate may be selected to both mitigate the risks of damage or injury in the event of making contact with an object or person and also discourage bystanders from attempting to grab or otherwise interfere with the payload-release assembly. In some cases, the selected initial ascent rate may correspond to the selected descent rate used to lower the payload to the ground below the particular distance.

At block 334, the ascending payload-release assembly is determined to be beyond the particular distance of the ground. The determination may be made by a computing control system on the payload-release assembly or the UAV (or associated with the UAV). For example, the determination may be based, at least in part, on sensor data from sensor(s) on the payload-release assembly, such as an altimeter and/or an inertial motion sensor. The particular distance from the ground may be a height below which interference with obstacles and/or bystanders is considered more likely and thus the particular distance may be based in part on typical heights of objects and/or people. The particular distance may be, for example, about 10 to 15 feet above the ground (about 3 to 5 meters from the ground).

At block 336, the ascent rate of the ascending payload-release assembly can be increased. The increase in the ascent rate can be performed in response to determining the payload-release assembly is beyond the particular distance from the ground. In some examples, the increased ascent rate may be a maximum rate of ascent that can be achieved by the tether-retraction mechanism, or a maximum acceleration that can be tolerated by the payload-release assembly or other components. The increased ascent rate may also be based on a determination of a maximally energy-efficient ascent rate profile (e.g., a variable ascent rate which maximizes the energy efficiency of the motor-driven winch that reels in the tether).

In practice, one or more of the operations described in connection with the processes 300 and 320 may be omitted or performed in a different order. For instance, referring to process 300, the UAV may begin retracting the payload-release assembly back to the UAV (block 312) prior to (or simultaneously with) using the bystander communication module to generate a retrieval cue (block 310). In another embodiment, the generation of the retrieval cue (block 310) may be omitted entirely from process 300. Other examples are also possible. In addition, some embodiments may involve a combination of the functions and operations described in connection with the processes 300 and 320. For instance, some implementations may involve both the use of a bystander communication module, as described above in connection with process 300, and the use of a variable descent and/or ascent rate, as described in connection with process 320. The bystander communication module and the speed of ascent/descent can then combine to contribute to a safe, efficient, and intuitive interaction between people on the ground and the retractable UAV delivery system. Various combinations and/or variations of the processes 300 and 320 are therefore possible, and are included within the presently disclosed subject matter.

C. Example Bystander Interactions During UAV Delivery

FIGS. 4A, 4B, 4C, 4D, and 4E show a UAV 400 that delivers a payload 408 while interacting with bystander(s) using a bystander communication module 412. The UAV 400 includes a retractable payload delivery system 410 having a tether-retraction mechanism 404, a tether 402, and a payload-release assembly 406. The payload-release assembly 406 includes a bystander communication module 412. The payload-release assembly 406 functions to selectively secure the payload 408 (e.g., during descent from the UAV) and release the payload 408 (e.g., upon reaching the ground). The retractable payload delivery system 410 and the bystander communication module 412 can function similarly to the payload delivery system(s) and bystander communication module(s) described above in connection with FIGS. 1-3. Thus, among other features, the payload-release assembly 406 can include sensor(s) and the bystander communication module 412 can include user interface components.

Figure 4A:
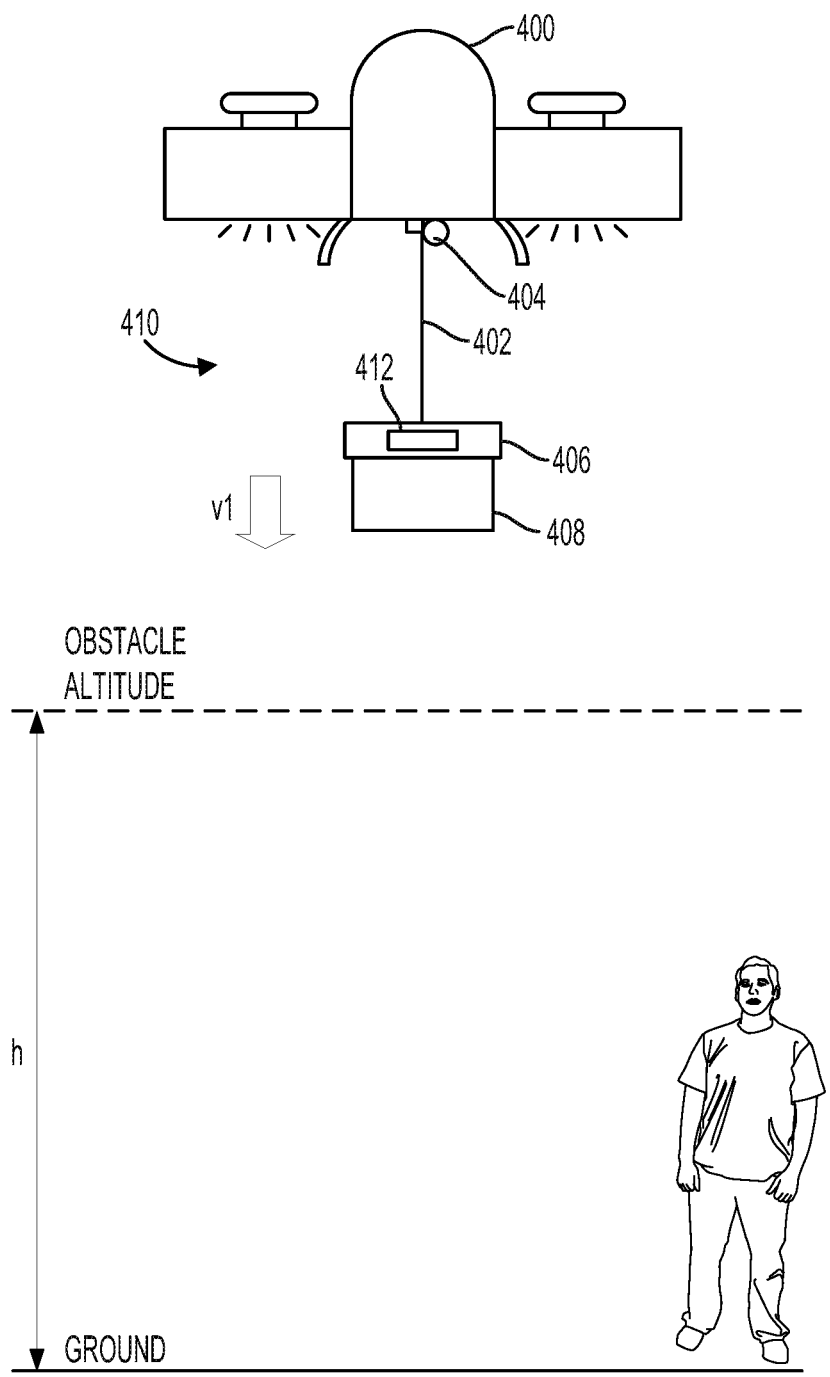
FIGS. 4A, 4B, 4C, 4D, and 4E show a UAV that delivers a payload while interacting with bystanders using a bystander communication module.

FIG. 4A shows the UAV 400 hovering a delivery location and using the retractable payload delivery system 410 to cause the payload 408 to descend from the UAV 400 at a first descent rate v1. The initial rate of descent can be a maximum descent rate, similar to the description of the initiate rate of descent in connection with block 322. As shown, in FIG. 4A, the descending payload 408 is above an obstacle altitude, which is labeled as a height "h" above the ground.

Figure 4B:
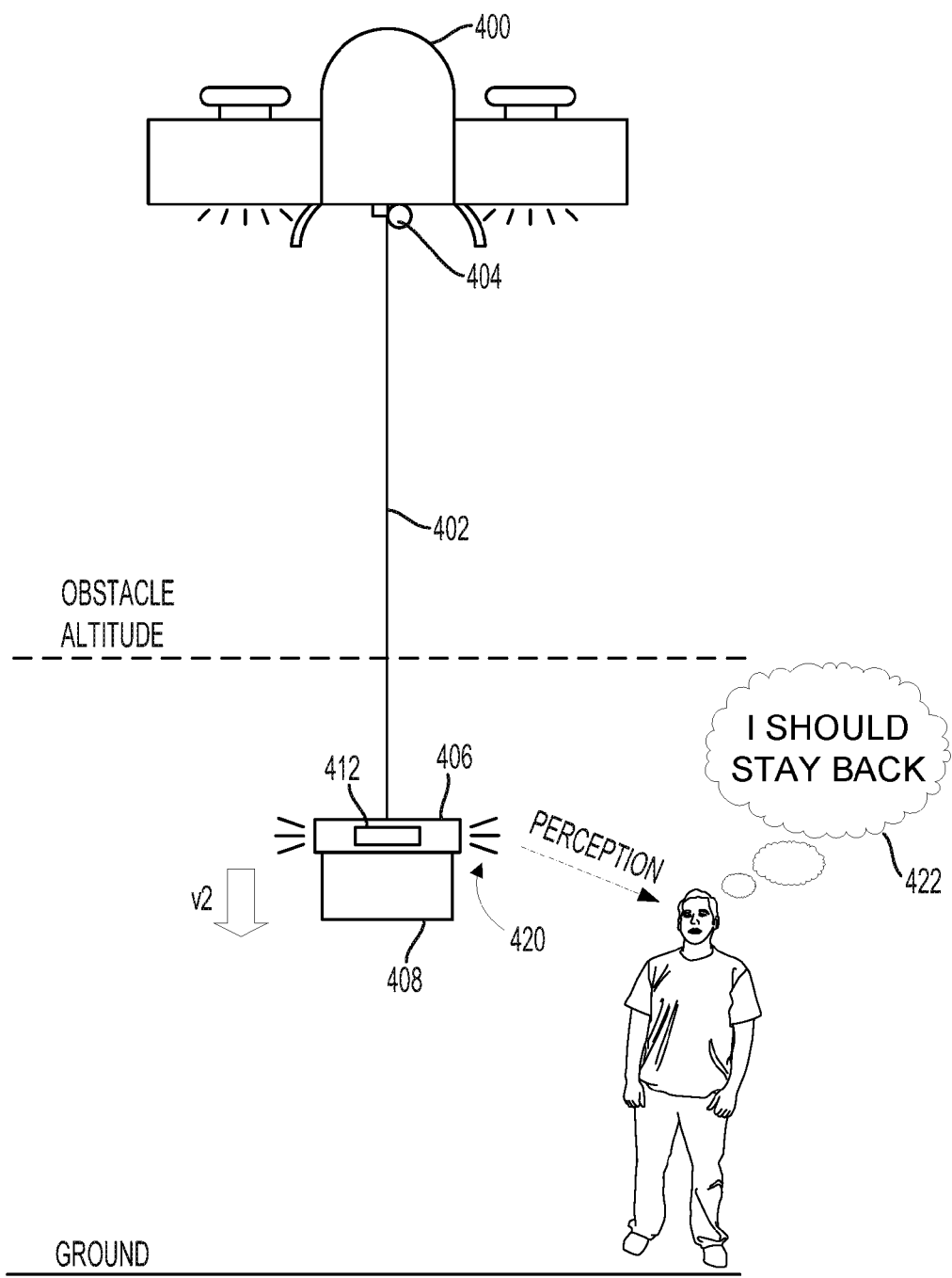

FIG. 4B shows the descending payload 408 after it is within the obstacle altitude (i.e., height h from the ground). While the payload-release assembly 406 continues to descent below the height h, the descent rate can slow to a second rate v2, and the bystander communication module 412 can generate an avoidance cue for perception by a bystander. The bystander perceives both the avoidance cue 420 and the descent rate v2 of the payload-release assembly 406, which can both be selected to encourage the bystander to avoid interference with the descending payload. Thus, while the payload-release assembly 406 is descending toward the ground, the bystander may conclude, for example, "I should stay back," as indicated by the thought bubble 422 in FIG. 4B.

Figure 4C:
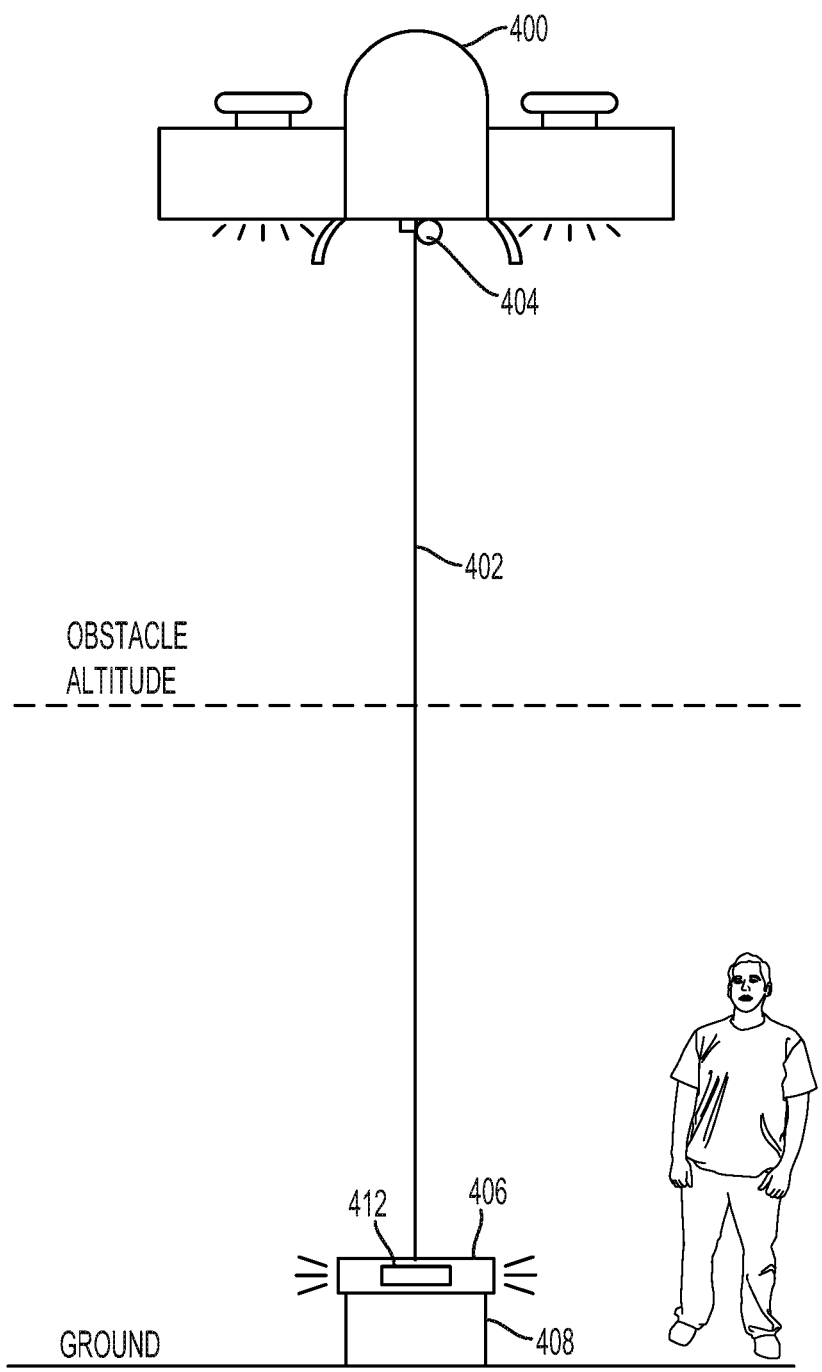

FIG. 4C shows the payload 408 touching the ground 408, just before the payload-release assembly 406 releases the payload 408. As described above, the payload making contact with the ground may involve a computer-implemented control system determining that the payload 408 is at or near the ground based on sensor data from sensors on the payload-release assembly 406, and then releasing the payload 408 from the payload-release assembly 406. After the payload 408 is released from the payload-release assembly 406, the payload-release assembly 406 can be retracted back to the UAV and the bystander communication module 412 can cease generating the avoidance cue 420 in favor of a retrieval cue. During the initial ascent of the payload-release assembly 406, the rate of ascent can be selected to be a rate v2 that both mitigates risks of damage or injury in the event of making contact with a bystander or other obstacle, but also discourages the bystander from interfering with the ascending payload-release assembly 406.

Figure 4D:
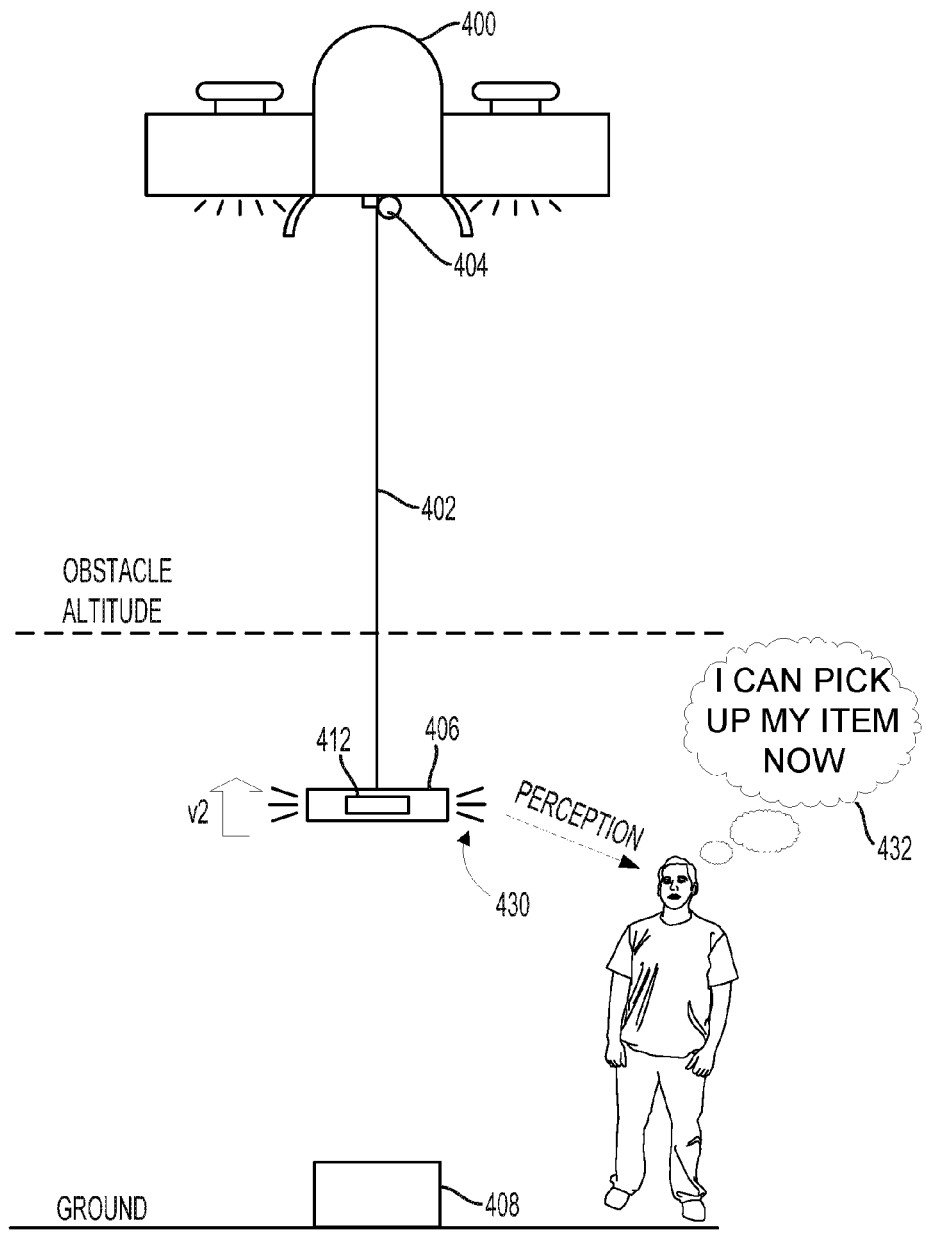

FIG. 4D shows the ascending payload 408 while it is still within the obstacle altitude (i.e., height h from the ground). While the payload-release assembly 406 continues to ascend, the ascent rate can be at the rate v2, and the bystander communication module 412 can generate a retrieval cue 430 for perception by a bystander. The bystander perceives both the retrieval cue 430 and the ascent rate v2 of the payload-release assembly 406, which can both be selected to encourage the bystander to avoid interference with the ascending payload-release assembly 406 and/or to encourage the bystander to retrieve the payload 408 from the ground. Thus, while the payload-release assembly 406 is ascending toward the UAV, the bystander may conclude, for example, "I can pick up my item now," as indicated by the thought bubble 432 in FIG. 4D.

Figure 4E:
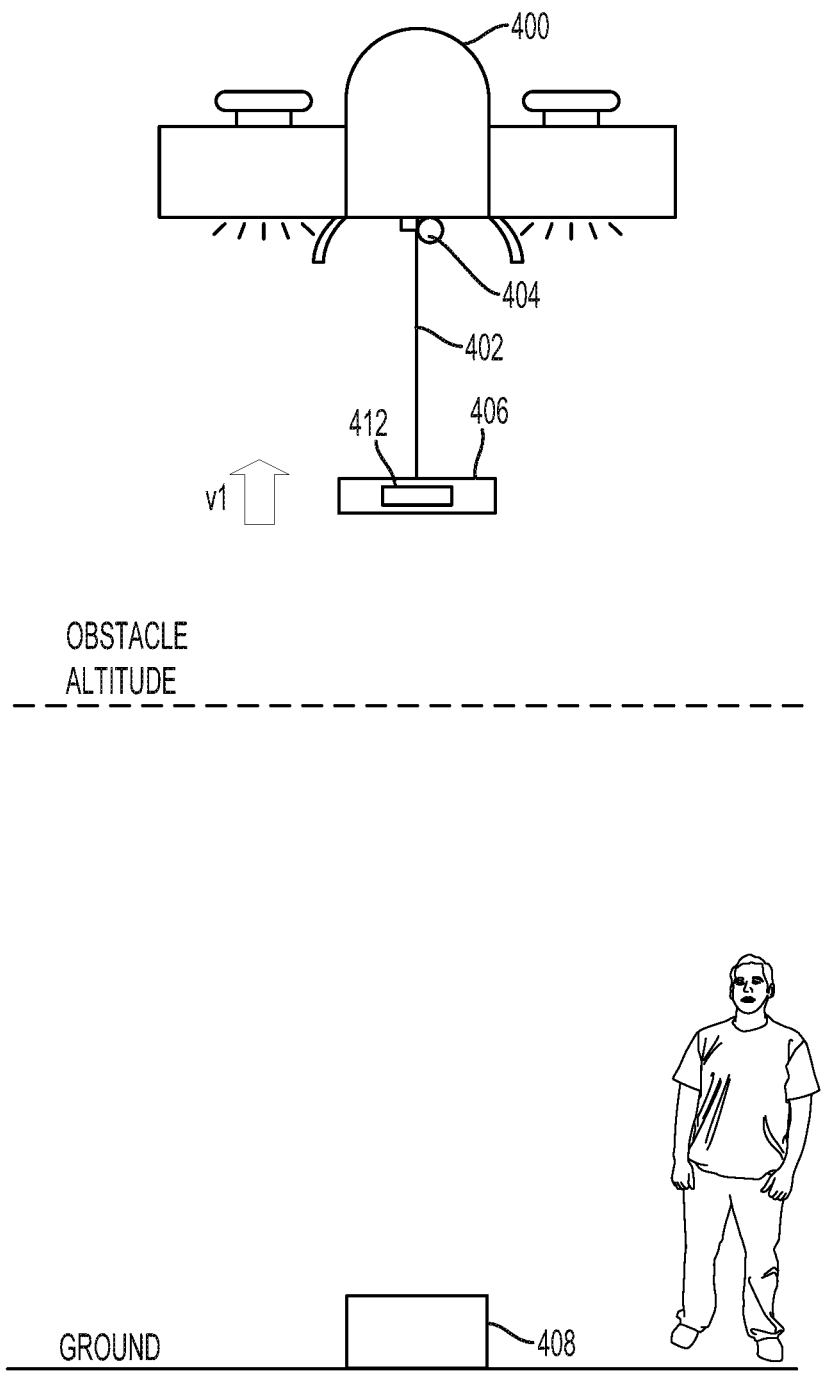

FIG. 4E shows the ascending payload-release assembly 406 after it is above the obstacle altitude (i.e., height h from the ground). After exceeding the obstacle altitude, the retracting payload-release assembly 406 can change from its initial ascent rate v2 to a faster ascent rate v1. For instance, the control system on the UAV can determine that the payload-release assembly 406 is above height h, perhaps based in part on sensor data from the payload-release assembly 406, and responsively use the tether-retraction mechanism to increase the ascent rate.

By increasing the rate of ascent/descent while the payload-release assembly 406 is above the obstacle altitude, the entire delivery operation can be performed faster, which saves time and energy for the hovering UAV 400. In addition, by slowing the rate of ascent/descent while the payload-release assembly 406 is below the obstacle altitude, the risk of damage and/or injury to bystanders and/or objects on the ground is mitigated because the payload-release assembly 406 is prevented from making impact at unsafe speed. In some examples, the payload delivery system 410 may operate to cause the payload-release assembly to ascend/descend at about 5 feet per second when above the obstacle altitude, and to ascend/descend at about 1 foot per second when below the obstacle altitude. It is noted that due to variations in braking functionality and capability, the rate of descent may be slowed before the descending payload-release assembly 406 reaches the obstacle altitude. For instance, the payload delivery system 410 may function to cause the payload-release assembly 406 to decelerate such that it is descending at the slower rate upon crossing the obstacle altitude.

V. EXAMPLE UAVS

FIGS. 5A, 5B, 5C, and 5D are simplified illustrations of example unmanned aerial vehicles, according to example embodiments. Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 5A:
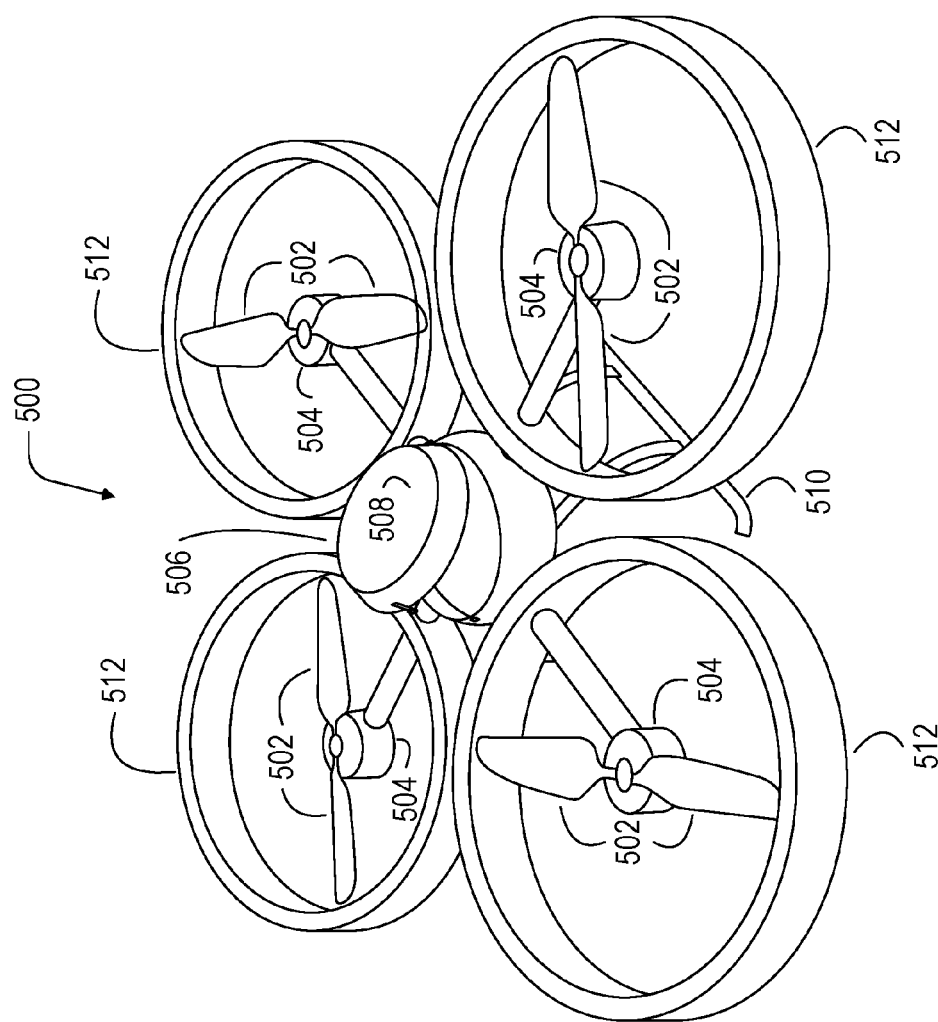
FIGS. 5A, 5B, 5C, and 5D are simplified illustrations of example unmanned aerial vehicles, according to example embodiments.

FIG. 5A is a simplified illustration of a UAV 500, according to an example embodiment. In particular, FIG. 5A shows an example of a rotorcraft 500 that is commonly referred to as a multicopter. Multicopter 500 may also be referred to as a quadcopter, as it includes four rotors 502. It should be understood that example embodiments may involve rotorcraft with more or less rotors than multicopter 500. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 500 in greater detail, the four rotors 502 provide propulsion and maneuverability for the multicopter 500. More specifically, each rotor 502 includes blades that are attached to a motor 504. Configured as such the rotors may allow the multicopter 500 to take off and land vertically, to maneuver in any direction, and/or to hover. Furthermore, the pitch of the blades may be adjusted as a group and/or differentially, and may allow a multicopter 502 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 500. Blade-pitch adjustment may be particularly useful for rotorcraft with substantial inertia in the rotors and/or drive train, but is not limited to such rotorcraft Additionally or alternatively, multicopter 500 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 500 also includes a central enclosure 506 with a hinged lid 508. The central enclosure may house, for example, control electronics such as an inertial measurement unit (IMU) and/or an electronic speed controller, batteries, other sensors, and/or a payload, among other possibilities.

The illustrative multicopter 500 also includes landing gear 510 to assist with controlled take-offs and landings. In other embodiments, multicopters and other types of UAVs without landing gear are also possible.

In a further aspect, multicopter 500 includes rotor protectors 512. Such rotor protectors 512 can serve multiple purposes, such as protecting the rotors 502 from damage if the multicopter 500 strays too close to an object, protecting the multicopter 500 structure from damage, and protecting nearby objects from being damaged by the rotors 502. It should be understood that in other embodiments, multicopters and other types of UAVs without rotor protectors are also possible. Further, rotor protectors of different shapes, sizes, and function are possible, without departing from the scope of the invention.

A multicopter 500 may control the direction and/or speed of its movement by controlling its pitch, roll, yaw, and/or altitude. To do so, multicopter 500 may increase or decrease the speeds at which the rotors 502 spin. For example, by maintaining a constant speed of three rotors 502 and decreasing the speed of a fourth rotor, the multicopter 500 can roll right, roll left, pitch forward, or pitch backward, depending upon which motor has its speed decreased. Specifically, the multicopter may roll in the direction of the motor with the decreased speed. As another example, increasing or decreasing the speed of all rotors 502 simultaneously can result in the multicopter 500 increasing or decreasing its altitude, respectively. As yet another example, increasing or decreasing the speed of rotors 502 that are turning in the same direction can result in the multicopter 500 performing a yaw-left or yaw-right movement. These are but a few examples of the different types of movement that can be accomplished by independently or collectively adjusting the RPM and/or the direction that rotors 502 are spinning.

Figure 5B:
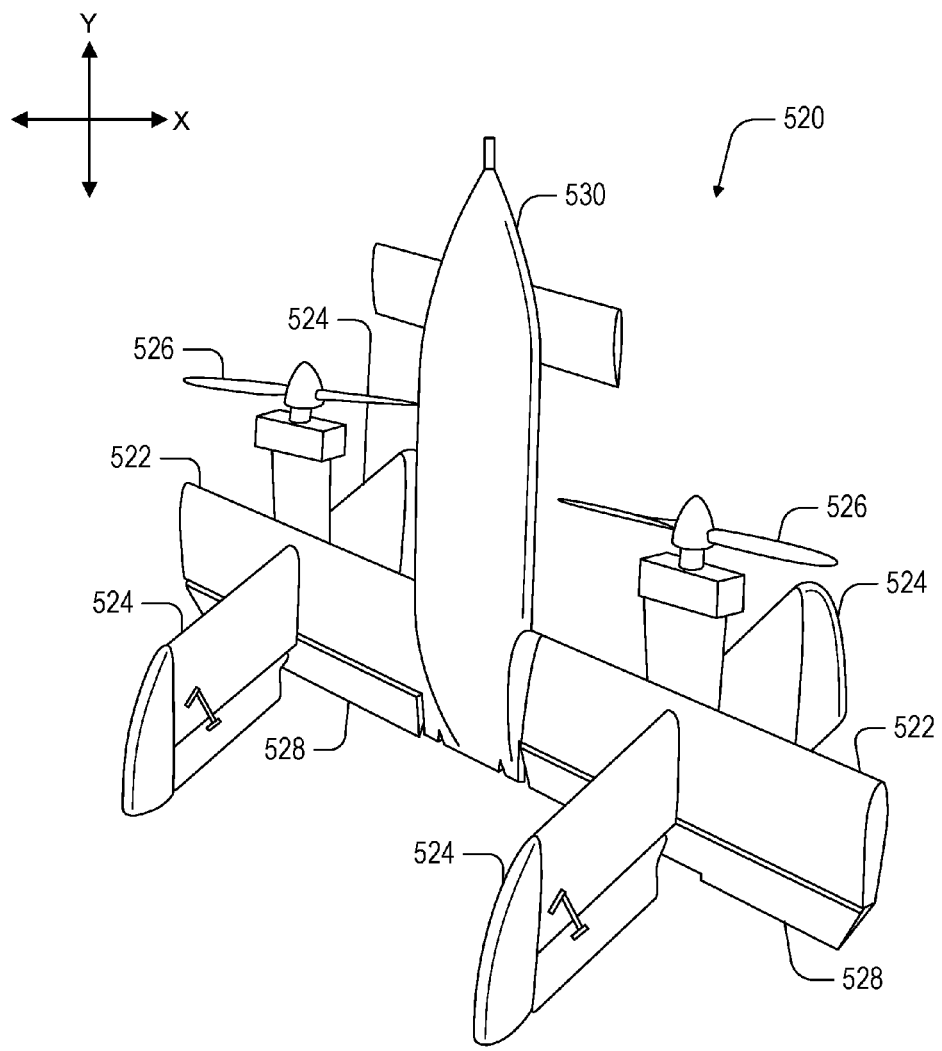

FIG. 5B is a simplified illustration of a UAV 520, according to an example embodiment. In particular, FIG. 5B shows an example of a tail-sitter UAV 520. In the illustrated example, the tail-sitter UAV 520 has fixed wings 522 to provide lift and allow the UAV to glide horizontally (e.g., along the x-axis, in a position that is approximately perpendicular to the position shown in FIG. 5B). However, the fixed wings 522 also allow the tail-sitter UAV 520 take off and land vertically on its own.

For example, at a launch site, tail-sitter UAV 520 may be positioned vertically (as shown) with fins 524 and/or wings 522 resting on the ground and stabilizing the UAV 520 in the vertical position. The tail-sitter UAV 520 may then take off by operating propellers 526 to generate the upward thrust (e.g., a thrust that is generally along the y-axis). Once at a suitable altitude, the tail-sitter UAV 520 may use its flaps 528 to reorient itself in a horizontal position, such that the fuselage 530 is closer to being aligned with the x-axis than the y-axis (e.g., aligned parallel to the ground). Positioned horizontally, the propellers 526 may provide forward thrust so that the tail-sitter UAV 520 can fly in a similar manner as a typical airplane.

Variations on the illustrated tail-sitter UAV 520 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 520 are also possible.

As noted above, some embodiments may involve other types of UAVs, in addition or in the alternative to multicopters. For instance, FIGS. 5C and 5D are simplified illustrations of other types of UAVs, according to example embodiments.

Figure 5C:
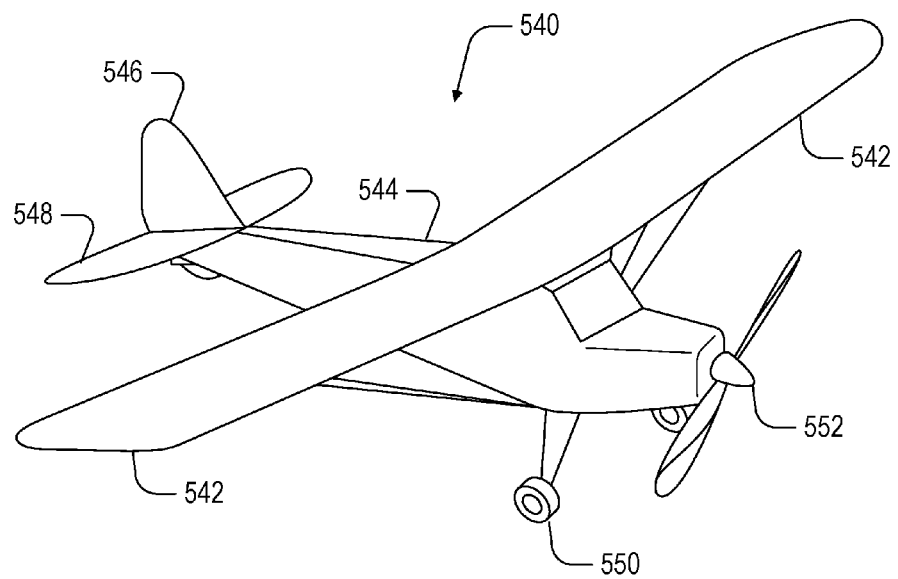

In particular, FIG. 5C shows an example of a fixed-wing aircraft 540, which may also be referred to as an airplane, an aeroplane, or simply a plane. A fixed-wing aircraft 540, as the name implies, has stationary wings 542 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 5C depicts some common structures used in a fixed-wing aircraft 540. In particular, fixed-wing aircraft 540 includes a fuselage 544, two horizontal wings 542 with an airfoil-shaped cross section to produce an aerodynamic force, a vertical stabilizer 546 (or fin) to stabilize the plane's yaw (turn left or right), a horizontal stabilizer 548 (also referred to as an elevator or tailplane) to stabilize pitch (tilt up or down), landing gear 550, and a propulsion unit 552, which can include a motor, shaft, and propeller.

Figure 5D:
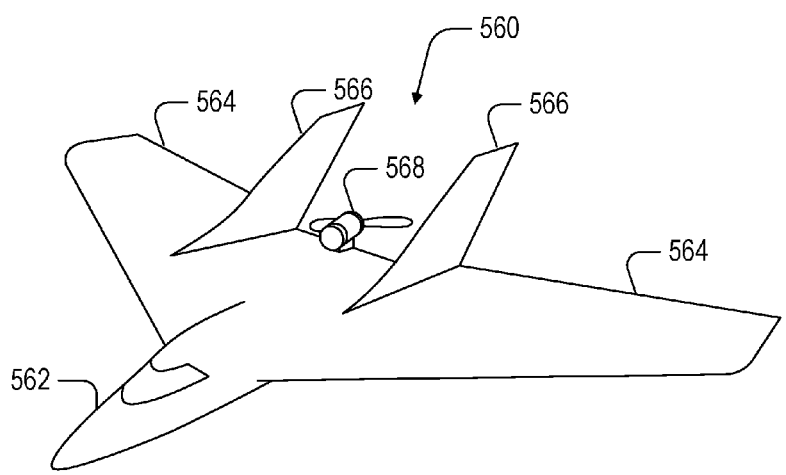

FIG. 5D shows an example of an aircraft 560 with a propeller in a pusher configuration. The term "pusher" refers to the fact that the propulsion unit 568 is mounted at the back of the aircraft and "pushes" the vehicle forward, in contrast to the propulsion unit being mounted at the front of the aircraft. Similar to the description provided for FIG. 5C, FIG. 5D depicts common structures used in the pusher plane: a fuselage 562, two horizontal wings 564, vertical stabilizers 566, and a propulsion unit 568, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

VI. EXAMPLE COMPONENTS OF A UAV

Figure 6:
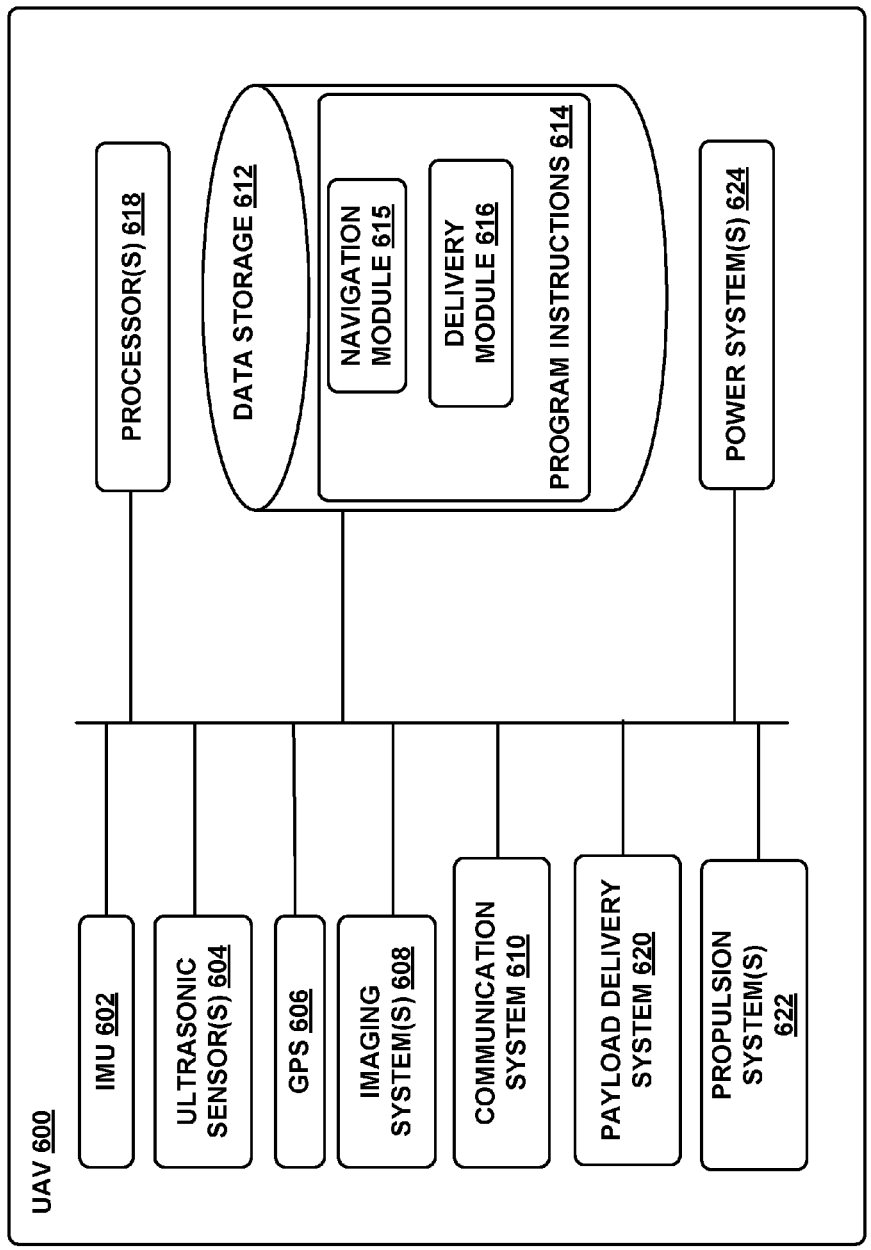
FIG. 6 is a simplified block diagram illustrating components of a UAV, according to an example embodiment.

FIG. 6 is a simplified block diagram illustrating components of a UAV 600, according to an example embodiment. UAV 600 may take the form of or be similar in form to one of the UAVs 500, 520, 540, and 560 shown in FIGS. 5A-5D. However, a UAV 600 may also take other forms.

UAV 600 may include various types of sensors, and may include a computing system configured to provide the functionality described herein. In the illustrated embodiment, the sensors of UAV 600 include an inertial measurement unit (IMU) 602, ultrasonic sensor(s) 604, GPS 606, imaging system(s) 608, among other possible sensors and sensing systems. The UAV 600 also includes a communication system 610, a payload delivery system 620, and propulsion system(s) 622.

The UAV 600 can include one or more processors 618. The processor(s) 618 may include a general-purpose processor or a special purpose processor (e.g., digital signal processors, application specific integrated circuits, etc.). The one or more processors 618 can be configured to execute computer-readable program instructions 614 that are stored in the data storage 612 and are executable to provide the functionality of a UAV described herein.

The data storage 612 may include or take the form of one or more computer-readable storage media that can be read or accessed by at least one processor 618. The one or more computer-readable storage media can include volatile and/or non-volatile storage components, such as optical, magnetic, organic or other memory or disc storage, which can be integrated in whole or in part with at least one of the one or more processors 618. In some embodiments, the data storage 612 can be implemented using a single physical device (e.g., one optical, magnetic, organic or other memory or disc storage unit), while in other embodiments, the data storage 612 can be implemented using two or more physical devices.

As noted, the data storage 612 can include computer-readable program instructions 614 and perhaps additional data, such as diagnostic data of the UAV 600. The program instructions 614 may be configured to cause the UAV 600 to perform or facilitate some or all of the UAV functionality described herein. For instance, in the illustrated embodiment, program instructions 614 include a navigation module 615 and an automated delivery module 616. The navigation module 615 can be a set of program instructions that, when executed by the processor(s) 618, generate flight commands to operate the propulsion system(s) 622 so as to cause the UAV 600 to navigate to a particular location and/or along a particular flight path. The delivery module 616 can be a set of program instructions that, when executed by the processor(s) 618, operate the payload delivery system 620 to lower a payload to the ground and release the payload. The delivery module 616 may also function to cause the UAV 600 to receive communication(s) from a remote operator indicative of a particular target location at which to deliver the payload and/or an authorization to initiate delivery and/or retraction of the payload delivery system 620. Other functions are also possible, including functions of the UAVs and payload delivery systems described above in connection with FIGS. 1-4.

A. Sensors

In an illustrative embodiment, IMU 602 may include both an accelerometer and a gyroscope, which may be used together to determine the orientation, position, and/or elevation of the UAV 600. In particular, the accelerometer can measure the orientation of the UAV 600 with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 600, slight errors in measurement may compound over time and result in a more significant error. However, an example UAV 600 may be able mitigate or reduce such errors by using a magnetometer to measure direction. One example of a magnetometer is a low-power, digital 3-axis magnetometer, which can be used to realize an orientation independent electronic compass for accurate heading information based on the Earth's magnetic field. However, other types of magnetometers may be utilized as well.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated embodiment, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 600 also includes a GPS receiver 606. The GPS receiver 606 may be configured to provide data that is typical of well-known GPS systems, such as the GPS coordinates of the UAV 600. Such GPS data may be utilized by the UAV 600 for various functions. For example, the UAV 600 may use its GPS receiver 606 to help navigate to a target GPS location. In some scenarios a target GPS location may be based in part on a database that associates GPS coordinates with street addresses or may be based in part on GPS coordinates obtained from a mobile device. Other examples are also possible.

UAV 500 may also include one or more imaging system(s) 608. For example, one or more still and/or video cameras may be utilized by a UAV 600 to capture image data from the UAV's environment. As a specific example, charge-coupled device (CCD) cameras or complementary metal-oxide-semiconductor (CMOS) cameras can be used with unmanned vehicles. Such imaging sensor(s) 608 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 608 to help in determining location. For example, UAV 600 may capture imagery of its environment and compare it to what it expects to see in its environment given current estimated position (e.g., its current GPS coordinates), and refine its estimate of its position based on this comparison.

In a further aspect, UAV 600 may include one or more microphones. Such microphones may be configured to capture sound from the UAVs environment. Other environmental sensors are also possible.

B. Navigation and Location Determination

The navigation module 615 may provide functionality that allows the UAV 600 to, e.g., move about in its environment and reach a desired location. To do so, the navigation module 615 may control the altitude and/or direction of flight by controlling the mechanical features of the UAV that affect flight (e.g., rotors 502 of UAV 500).

In order to navigate the UAV 600 to a target location, a navigation module 615 may implement various navigation techniques, such as map-based navigation and localization-based navigation, for instance. With map-based navigation, the UAV 600 may be provided with a map of its environment, which may then be used to navigate to a particular location on the map. With localization-based navigation, the UAV 600 may be capable of navigating in an unknown environment using localization. Localization-based navigation may involve a UAV 600 building its own map of its environment and calculating its position within the map and/or the position of objects in the environment. For example, as a UAV 600 moves throughout its environment, the UAV 600 may continuously use localization to update its map of the environment. This continuous mapping process may be referred to as simultaneous localization and mapping (SLAM). Other navigation techniques may also be utilized.

In some embodiments, the navigation module 615 may navigate using a technique that relies on waypoints. In particular, waypoints are sets of coordinates that identify points in physical space. For instance, an air-navigation waypoint may be defined by a certain latitude, longitude, and altitude. Accordingly, navigation module 615 may cause UAV 600 to move from waypoint to waypoint, in order to ultimately travel to a final destination (e.g., a final waypoint in a sequence of waypoints).

In a further aspect, navigation module 615 and/or other components and systems of UAV 600 may be configured for "localization" to more precisely navigate to the scene of a medical situation or other target location. More specifically, it may be desirable in certain situations for a UAV to be close to the person in need of medical support (e.g., within reach of the person), so as to properly provide medical support to the person. To this end, the UAV 600 may use a two-tiered approach in which it uses a more-general location-determination technique to navigate to a target area, and then use a more-refined location-determination technique to identify and/or navigate to the target location within the target area.

In an alternative arrangement, a navigation module may be implemented at a remote computing device (e.g., a computing device associated with a remote operator), which communicates wirelessly with the UAV 600. The remote computing device may receive data indicating the operational state of the UAV 600, sensor data from the UAV 600 that allows it to assess the environmental conditions being experienced by the UAV 600, and/or location information for the UAV 600. Provided with such information, the remote computing device may determine altitudinal and/or directional adjustments that should be made by the UAV 600 and/or may determine how the UAV should adjust its mechanical features (e.g., rotors 502 of UAV 500) in order to effectuate such movements. The remote computing system may then communicate such adjustments to the UAV 600 so it can move in the determined manner. Such commands to the electromechanical propulsion systems 622 of the UAV 600 may be referred to herein as flight-control commands, whether generated by a remote computing system or by the navigation module 615 on the UAV 600.

C. Payload Delivery

The payload delivery module 616 may provide functionality that allows the UAV 600 to autonomously or semi-autonomously lower a payload to the ground and release the payload, thereby effecting delivery of the payload on the ground. In practice, the payload delivery module 616 may be a set of program instructions that generates commands to electromechanical components and/or control systems of the payload delivery system 620 (e.g., the payload delivery system 410 of UAV 400 or the payload delivery system 110 of UAV 100).

The payload delivery system 620 may include aspects that selectively secure and release a payload (e.g., the payload-release assembly 106), and that selectively lower the payload to the ground (e.g., the tether-deployment mechanism 104 and tether 102). In some cases, the payload may be lowered to the ground using a retractable payload-release assembly that is secured to the payload and that includes sensors to facilitate monitoring of the payload as it descends from the UAV 600. The payload-release assembly may, for example, communicate information from an inertial measurement unit and/or altimeter via a wireless connection with the UAV 600. Data from such sensors on the payload-release assembly can then be used by the payload delivery module 616 to determine when the payload and/or the payload-release assembly have reached the ground (e.g., based on accelerometer data consistent with an impact with the ground). Data from the sensors can also be used to determine whether the payload, payload-release assembly, and/or tether may have become stuck in an obstacle such as a tree or fence, or otherwise interfered with by a vehicle or perhaps a pedestrian.

In addition, the payload delivery module 616 can function to cause the payload-release assembly to ascend/descend at rates selected to encourage an intuitive, safe, and efficient interaction between the payload delivery system and people on the ground, as described above. Additionally or alternatively, the payload delivery module 616 can cause a bystander communication module to generate cues for perception by people on the ground during the delivery operation as described above. Other functionality of the payload delivery system 620 (and the payload delivery module 616) may include functions of the payload delivery system 110 described above in connection with FIGS. 1-4.

D. Communication Systems

In a further aspect, UAV 600 includes one or more communication systems 610. The communications systems 610 may include one or more wireless interfaces and/or one or more wireline interfaces, which allow UAV 600 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 600 may include communication systems 610 that allow for both short-range communication and long-range communication. For example, the UAV 600 may be configured for short-range communications using Bluetooth and for long-range communications under a CDMA protocol. In such an embodiment, the UAV 600 may be configured to function as a "hot spot;" or in other words, as a gateway or proxy between a remote support device and one or more data networks, such as cellular network and/or the Internet. Configured as such, the UAV 600 may facilitate data communications that the remote support device would otherwise be unable to perform by itself.

For example, UAV 600 may provide a WiFi connection to a remote device, and serve as a proxy or gateway to a cellular service provider's data network, which the UAV 600 might connect to under an LTE or a 3G protocol, for instance. The UAV 600 could also serve as a proxy or gateway to a high-altitude balloon network, a satellite network, or a combination of these networks, among others, which a remote device might not be able to otherwise access.

E. Power Systems

In a further aspect, UAV 600 may include power system(s) 624. A power system 624 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

F. Payloads

UAV 600 may employ various systems and configurations in order to transport items. In the illustrated embodiment, a payload 626 may serve as a compartment that can hold one or more items, such that a UAV 600 can deliver the one or more items to a target delivery location. For example, as shown in FIG. 5A, the UAV 500 can include a compartment 508, in which an item or items may be transported. As another example, the UAV 600 can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 626 of a given UAV 600 may include or take the form of a "package" designed to transport medical-support items to a target delivery location. For example, a medical-support UAV may include a package with one or more items for medical support in the particular medical situation, and/or one or more medical-support modules that are designed to provide medical support in the particular medical situation. In some cases, a UAV 600 may include a package that is designed for a particular medical situation such as choking, cardiac arrest, shock, asthma, drowning, etc. In other cases, a UAV 600 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 624 for power.

In some embodiments, UAV 600 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, UAV 600 might function as a mobile defibrillator. Specifically, rather than carry a stand-alone defibrillator that can then be removed from the UAV for use, the UAV itself may function as a defibrillator.

G. Service Modules

As noted above, UAV 600 may include one or more service modules. The one or more service modules may include software, firmware, and/or hardware that may help to provide or assist in the provision of the UAV-related services. In some examples, the one or more service modules described herein may be implemented, at least in part, by the program instructions 614 configured to be executed by the processor(s) 618.

Configured as such, a UAV 600 may provide various types of service. For instance, the UAV 600 may have stored information that can be provided to a person or persons at the target location, in order to assist the person or persons in various ways. For example, the UAV 600 may include a video or audio file with instructions for performing some task, which the UAV 600 can play out to a person at the target location. As another example, the UAV 600 may include an interactive program to assist a person at the target location in performing some task. For instance, the UAV 600 may include an application that analyzes the person's speech to detect questions related to the medical situation and/or that provides a text-based interface via which the person can ask such questions, and then determines and provides answers to such questions.

In some embodiments, UAV 600 may facilitate communication between a layperson and/or medical personnel at the scene and medical personnel at a remote location. As an example, a service module may provide a user interface via which a person at the scene can use a communication system 610 of the UAV to communicate with an emergency medical technician at a remote location. As another example, the UAV 600 can unlock certain capabilities of a remote device, such as a mobile phone, which is near the UAV 600 at the scene of a medical situation. Such capabilities may be inaccessible to a user of the remote device, unless the remote device is within a certain distance from the UAV 600 such that the UAV 600 can unlock the capabilities. For example, the UAV 600 may send the remote device a security key that allows the remote device to establish a secure connection to communicate with medical personnel at a remote location. Other examples are also possible.

VII. EXAMPLE UAV SYSTEMS

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 7 is a simplified block diagram illustrating a distributed UAV system 700, according to an example embodiment.

In an example UAV system 700, an access system 702 may allow for interaction with, control of, and/or utilization of a network of UAVs 704. In some embodiments, an access system 702 may be a computing system that allows for human-controlled dispatch of UAVs 704. As such, the control system may include or otherwise provide a user interface (UI) 703 via which a user can access and/or control UAVs 704. In some embodiments, dispatch of UAVs 704 may additionally or alternatively be accomplished via one or more automated processes. The access system 702 and associated UI 703 that allow for human-controlled dispatch may be implemented, for example, using a remote terminal similar to the remote terminal 240 for supervisory control described in connection with FIG. 2.

Further, the access system 702 may provide for remote operation of a UAV. For instance, an access system 702 may allow an operator to control the flight of a UAV 704 via user interface 703. As a specific example, an operator may use an access system to dispatch a UAV 704 to deliver a package to a target location, or to travel to the location of a medical situation with medical-support items. The UAV 704 may then autonomously navigate to the general area of the target location. At this point, the operator may use the access system 702 to take over control of the UAV 704, and navigate the UAV to the target location (e.g., to a particular person to whom a payload is being sent). Other examples of remote operation of the UAV 704 are also possible.

The UAVs 704 may take various forms. For example, each UAV 704 may be a UAV such as those illustrated in FIGS. 5A-5D. However, UAV system 700 may also utilize other types of UAVs without departing from the scope of the present disclosure. In some implementations, all UAVs 704 may be of the same or a similar configuration. However, in other implementations, UAVs 704 may include a number of different types of UAVs. For instance, UAVs 704 may include a number of types of UAVs, with each type of UAV being configured for a different type or types of medical support.

A remote device 706 may take various forms. Generally, a remote device 706 may be any device via which a direct or indirect request to dispatch UAV 704 can be made. (Note that an indirect request may involve any communication that may be responded to by dispatching a UAV; e.g., requesting a payload delivery, or sending a request for medical support). In an example embodiment, a remote device 706 may be a mobile phone, tablet computer, laptop computer, personal computer, or any network-connected computing device. Further, in some instances, remote device 706 may not be a computing device. As an example, a standard telephone, which allows for communication via plain old telephone service (POTS), may serve as a remote device 706. Other types of remote devices are also possible.

Further, a remote device 706 may be configured to communicate with access system 702 via one or more types of communication network(s). For example, a remote device 706 could communicate with access system 702 (or via a human operator of the access system) by placing a phone call over a POTS network, a cellular network, and/or a data network such as the Internet. Other types of networks may also be utilized.

In some embodiments, a remote device 706 may be configured to allow a user to request delivery of one or more items to a desired location. For example, a user could request UAV delivery of a payload to their home via their mobile phone, tablet, or laptop. As another example, a user could request dynamic delivery to whatever location they are at at the time of delivery. To provide such dynamic delivery, the UAV system 700 may receive location information (e.g., GPS coordinates, etc.) from the user's mobile phone, or any other device on the user's person, such that the UAV 704 can navigate to the user's location (as indicated by their mobile phone).

In an example arrangement, central dispatch system 708 may be a server or group of servers, which is configured to receive dispatch messages requests and/or dispatch instructions from an access system 702. Such dispatch messages may request or instruct the central dispatch system 708 to coordinate the deployment of UAVs to various target locations. A central dispatch system 708 may be further configured to route such requests or instructions to local dispatch systems 710. To provide such functionality, central dispatch system 708 may communicate with access system 702 via a data network, such as the Internet or a private network that is established for communications between access systems and automated dispatch systems.

In the illustrated configuration, central dispatch system 708 may be configured to coordinate the dispatch of UAVs 704 from a number of different local dispatch systems 710. As such, central dispatch system 708 may keep track of which UAVs 704 are located at which local dispatch systems 710, which UAVs 704 are currently available for deployment, and/or which services or operations each of the UAVs 704 is configured for (in the event that a UAV fleet includes multiple types of UAVs configured for different services and/or operations). Additionally or alternatively, each local dispatch system 710 may be configured to track which of its associated UAVs 704 are currently available for deployment and/or which services or operations each of its associated UAVs is configured for.

In some cases, when central dispatch system 708 receives a request for UAV-related service from an access system 702, central dispatch system 708 may select a specific UAV 704 to dispatch. The central dispatch system 708 may accordingly instruct the local dispatch system 710 that is associated with the selected UAV to dispatch the selected UAV. The local dispatch system 710 may then operate its associated deployment system 712 to launch the selected UAV. In other cases, a central dispatch system 708 may forward a request for a UAV-related service to a local dispatch system 710 that is near the location where the support is requested, and leave the selection of a particular UAV 704 to the local dispatch system 710.

In an example configuration, a local dispatch system 710 may be implemented in a computing system at the same location as the deployment system or systems 712 that it controls. For example, in some embodiments, a local dispatch system 710 could be implemented by a computing system at a building, such as a fire station, where the deployment systems 712 and UAVs 704 that are associated with the particular local dispatch system 710 are also located. In other embodiments, a local dispatch system 710 could be implemented at a location that is remote to its associated deployment systems 712 and UAVs 704.

Numerous variations on and alternatives to the illustrated configuration of UAV system 700 are possible. For example, in some embodiments, a user of a remote device 706 could request medical support directly from a central dispatch system 708. To do so, an application may be implemented on a remote device 706 that allows the user to provide information regarding a requested service, and generate and send a data message to request that the UAV system provide the service. In such an embodiment, central dispatch system 708 may include automated functionality to handle requests that are generated by such an application, evaluate such requests, and, if appropriate, coordinate with an appropriate local dispatch system 710 to deploy a UAV.

Further, in some implementations, some or all of the functionality that is attributed herein to central dispatch system 708, local dispatch system(s) 710, access system 702, and/or deployment system(s) 712 could be combined in a single system, implemented in a more complex system, and/or redistributed among central dispatch system 708, local dispatch system(s) 710, access system 702, and/or deployment system(s) 712 in various ways.

Yet further, while each local dispatch system 710 is shown as having two associated deployment systems, a given local dispatch system 710 may have more or less associated deployment systems. Similarly, while central dispatch system 708 is shown as being in communication with two local dispatch systems 710, a central dispatch system may be in communication with more or less local dispatch systems 710.

In a further aspect, a deployment system 712 may take various forms. In general, a deployment system may take the form of or include a system for physically launching a UAV 704. Such a launch system may include features that allow for a human-assisted UAV launch and/or features that provide for an automated UAV launch. Further, a deployment system 712 may be configured to launch one particular UAV 704, or to launch multiple UAVs 704.

A deployment system 712 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HIVID, or by checking that medicine has not expired).

In some embodiments, the deployment systems 712 and their corresponding UAVs 704 (and possibly associated local dispatch systems 710) may be strategically distributed throughout an area such as a city. For example, deployment systems 712 may be located on the roofs of certain municipal buildings, such as fire stations, which can thus serve as the dispatch locations for UAVs 704. Fire stations may function well for UAV dispatch, as fire stations tend to be distributed well with respect to population density, their roofs tend to be flat, and the use of firehouse roofs as leased spaces for UAV dispatch could further the public good. However, deployment systems 712 (and possibly the local dispatch systems 710) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 700 may include or have access to a user-account database 714. The user-account database 714 may include data for a number of user-accounts, which are each associated with one or more persons. For a given user-account, the user-account database 714 may include data related to or useful in providing UAV-related services. Typically, the user data associated with each user-account is optionally provided by an associated user and/or is collected with the associated user's permission.

Further, in some embodiments, a person may have to register for a user-account with the UAV system 700 in order to use or be provided with UAV-related services by the UAVs 704 of UAV system 700. As such, the user-account database 714 may include authorization information for a given user-account (e.g., a user-name and password), and/or other information that may be used to authorize access to a user-account.

In some embodiments, a person may associate one or more of their devices with their user-account, such that they can be provided with access to the services of UAV system 700. For example, when a person uses an associated mobile phone to, e.g., place a call to an operator of access system 702 or send a message requesting a UAV-related service to a dispatch system, the phone may be identified via a unique device identification number, and the call or message may then be attributed to the associated user-account. Other examples are also possible.

VIII. CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
 a retractable delivery system comprising: (i) a tether coupled to an unmanned aerial vehicle (UAV) and configured to selectively secure a payload, and (ii) a retraction system coupled to the tether and operable to lower the payload from the UAV towards ground;

a bystander communication module, wherein the bystander communication module is configured to generate an avoidance cue for bystander perception; and a control system configured to:
while the UAV hovers over a delivery location, use the retraction system to lower the payload from the UAV towards a ground;
while the payload is being lowered from the UAV, cause the bystander communication module to generate the avoidance cue;
determine that the payload is at or near the ground; and
in response to determining that the payload is at or near the ground, cause the payload to be released from the tether.

2. The system of claim 1, wherein the bystander communication module is further configured to generate a retrieval cue for bystander perception, and wherein the control system is further configured to cause the bystander communication module to generate the retrieval cue in response to causing the payload to be released.

3. The system of claim 1, wherein the avoidance cue is configured to discourage a bystander from making contact with the payload, and wherein the bystander communication module comprises one or more of: (i) an audio transducer configured to emit an audible signal for bystander perception, and (ii) a light source configured to emit a visible signal for bystander perception.

4. The system of claim 1, wherein the payload further comprises one or more sensors, wherein the control system is further configured to, while the payload is secured and being lowered from the UAV, receive sensor data from the one or more sensors, and wherein the control system determining that the payload is at or near the ground comprises the control system determining that the payload is at or near the ground based at least in part on the received sensor data.

5. The system of claim 4, wherein the one or more sensors comprise an accelerometer, and wherein the control system determining that the payload is at or near the ground comprises the control system determining, based on sensor data from the accelerometer, that the payload underwent an impact with the ground.

6. The system of claim 1, wherein the control system is further configured to use the retraction system to cause the tether to retract back to the UAV after the payload is released therefrom.

7. The system of claim 6, wherein the control system using the retraction system to cause the tether to retract back to the UAV comprises: (i) using the retraction system to cause the tether to retract towards the UAV at a first ascent rate; (ii) determining, based at least in part on received sensor data, that a distal end of the tether is a particular distance from the ground; and (iii) in response to determining that that the distal end of the tether is the particular distance from the ground, using the retraction system to cause the retraction of the tether to increase from the first ascent rate to a second ascent rate faster than the first ascent rate.

8. The system of claim 1, wherein the control system is further configured to:
while the payload is descending, determine that the payload is within a particular distance of the ground; and
in response to determining that the payload is within the particular distance of the ground, cause a rate of descent of the payload to change from a first rate to a second rate slower than the first rate.

9. The system of claim 1, wherein the control system is further configured to:
while the payload is descending, determine that the payload is within a particular distance of the ground; and
in response to determining that the payload is within the particular distance of the ground, cause the bystander communication module to generate the avoidance cue.

10. A method comprising:
while an unmanned aerial vehicle (UAV) hovers over a delivery location, initiating delivery using a retractable delivery system, wherein the retractable delivery system comprises: (i) a tether coupled to an unmanned aerial vehicle (UAV) and configured to selectively secure a payload, (ii) a retraction system coupled to the tether and operable to lower the payload from the UAV towards ground, and (iii) one or more electromechanical components configured to selectively secure the payload and release the payload, and wherein initiating delivery comprises lowering the payload from the UAV toward the ground;
while the payload is being lowered from the UAV, causing a bystander communication module to generate an avoidance cue for bystander perception, wherein the bystander communication module is situated on the tether;
determining that the payload is at or near the ground; and
in response to determining that the payload is at or near the ground, releasing the payload.

11. The method of claim 10, wherein the bystander communication module is further configured to generate a retrieval cue for bystander perception, and wherein the method further comprises causing the bystander communication module to generate the retrieval cue in response to causing the payload to be released.

12. The method of claim 10, wherein the bystander communication module comprises one or more of an audio transducer configured to emit an audible signal for bystander perception and a light source configured to emit a visible signal for bystander perception, and wherein the avoidance cue is configured to discourage a bystander from making contact with the payload.

13. The method of claim 10, further comprising:
while the payload is descending, determining that the payload is within a particular distance of the ground; and
in response to determining that the payload is within the particular distance of the ground, causing the bystander communication module to generate the avoidance cue.

14. The method of claim 10, further comprising:
while the payload is descending, determining that the payload is within a particular distance of the ground; and
in response to determining that the payload is within the particular distance of the ground, using the retraction system to cause a rate of descent of the payload to change from a first rate to a second rate slower than the first rate.

15. The method of claim 10, further comprising:
using the retraction system to cause the tether to retract back to the UAV in response to release of the payload.

16. The method of claim 15, wherein using the retraction system to cause the tether to retract comprises: (i) using the retraction system to cause the tether to retract towards the UAV at a first ascent rate; (ii) determining, based at least in part on received sensor data, that a distal end of the tether is a particular distance from the ground; and (iii) in response to determining that that the distal end of the tether is the particular distance from the ground, using the retraction system to cause the retraction of the tether to increase from the first ascent rate to a second ascent rate faster than the first ascent rate.

17. The method of claim 10, further comprising receiving sensor data from one or more sensors situated on the tether or payload, and wherein determining that the payload is at or near the ground comprises determining that the payload is at or near the ground based at least in part on the received sensor data.

18. The method of claim 17, wherein the one or more sensors comprise an accelerometer, and wherein determining that the payload is at or near the ground comprises determining, based on sensor data from the accelerometer, that the payload underwent an impact with the ground.

* * * * *